Jan. 31, 1961  F. A. REECE  2,969,755
BUTTON SEWING MACHINE
Filed July 12, 1954  17 Sheets-Sheet 2
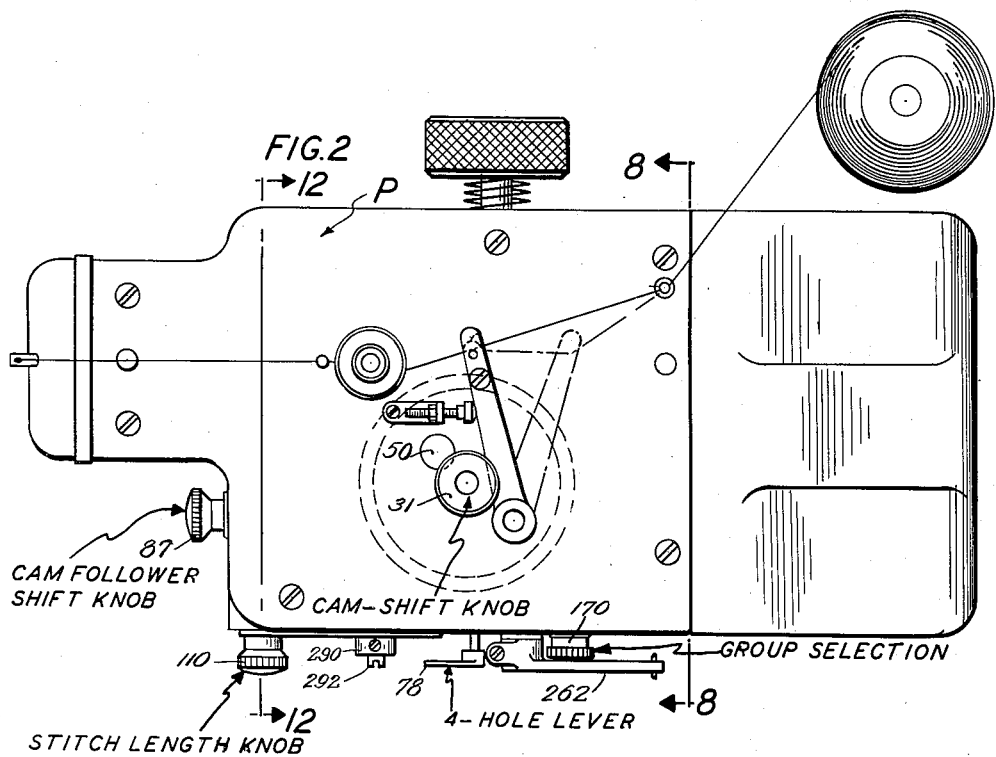
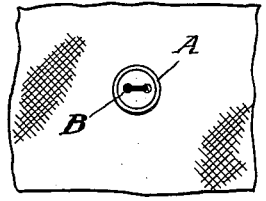
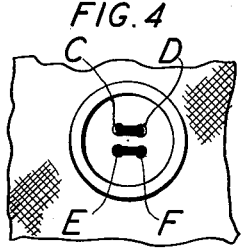
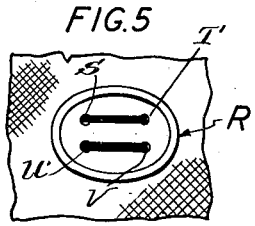
INVENTOR
FRANKLIN A. REECE
ATTYS.

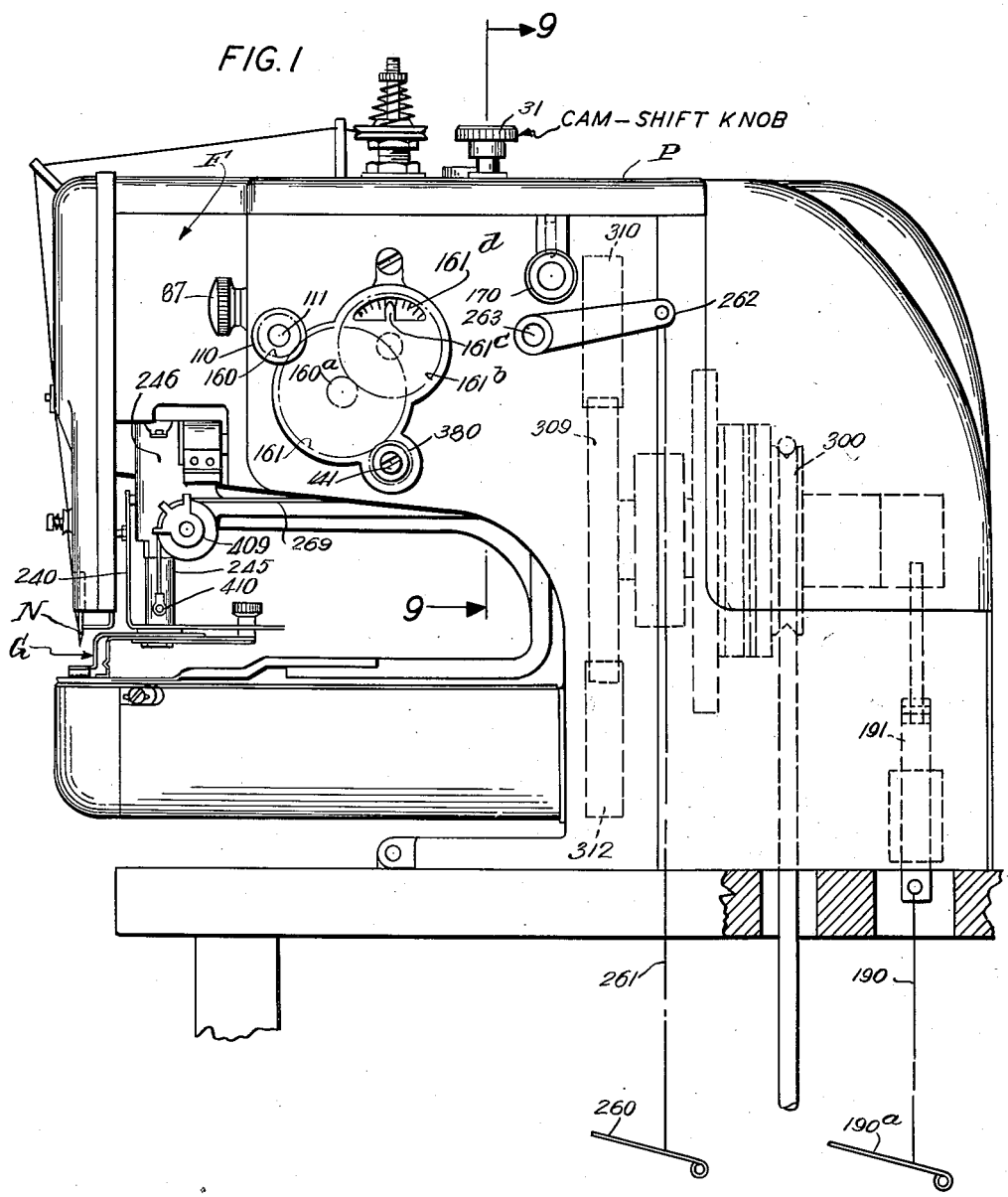

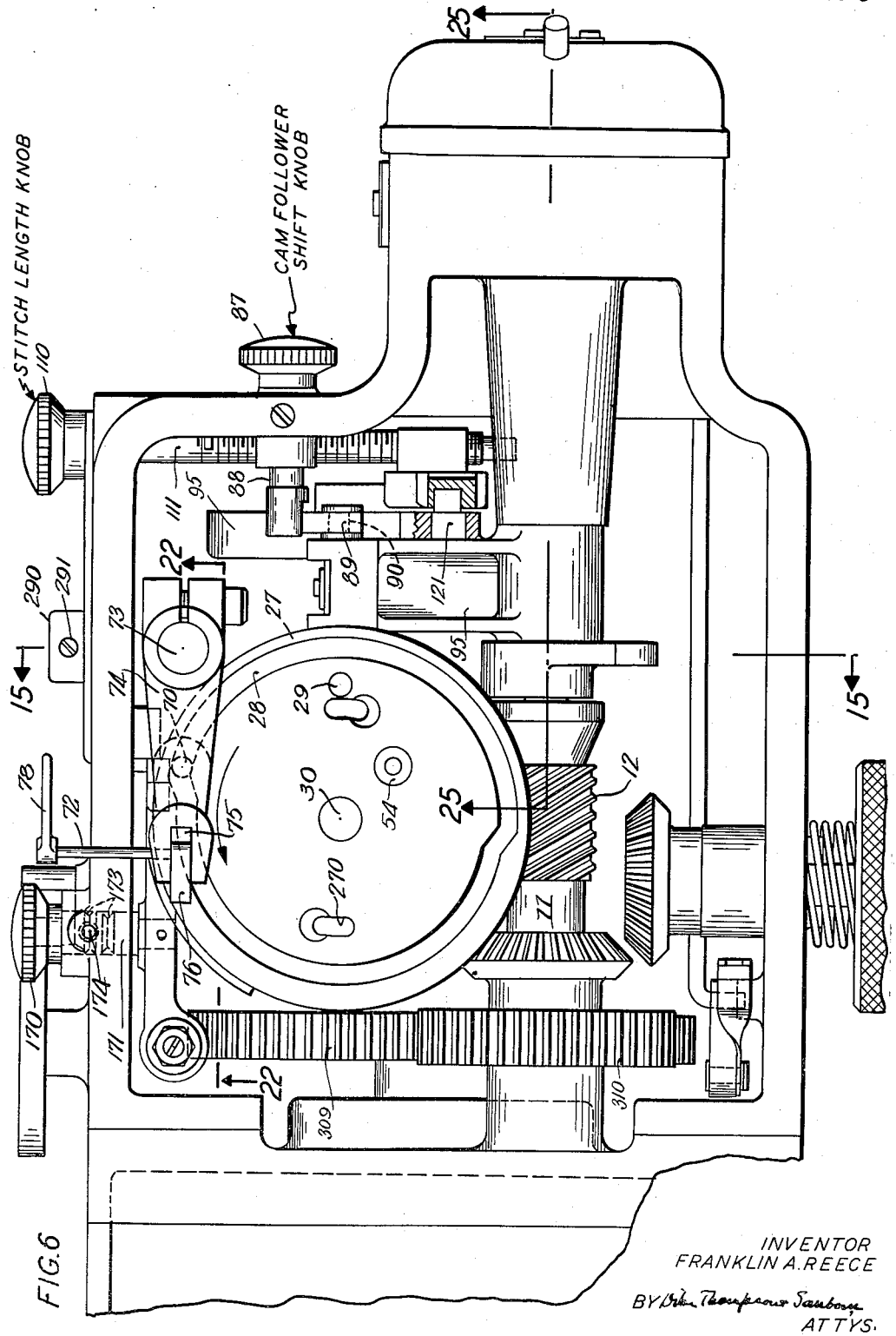

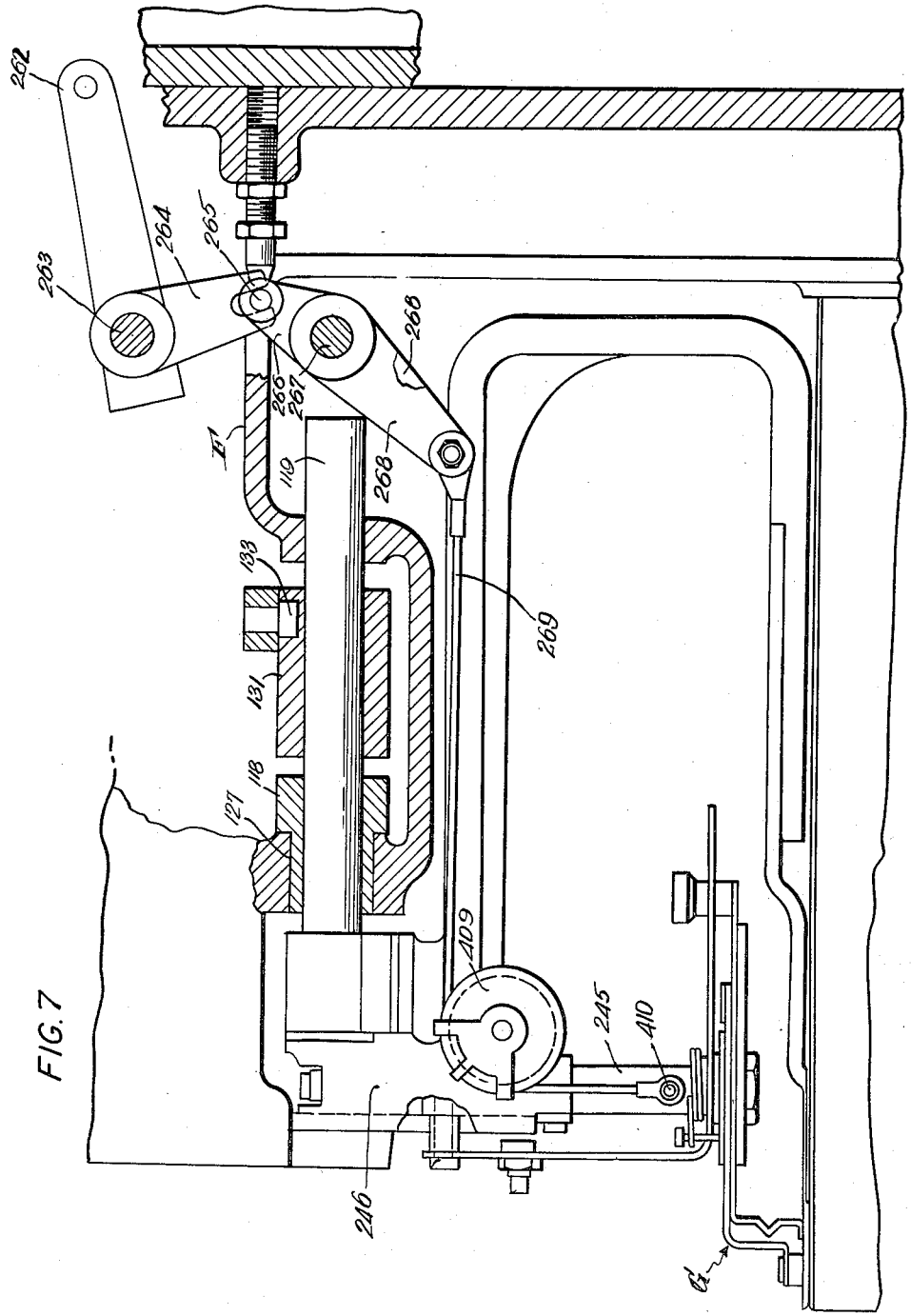

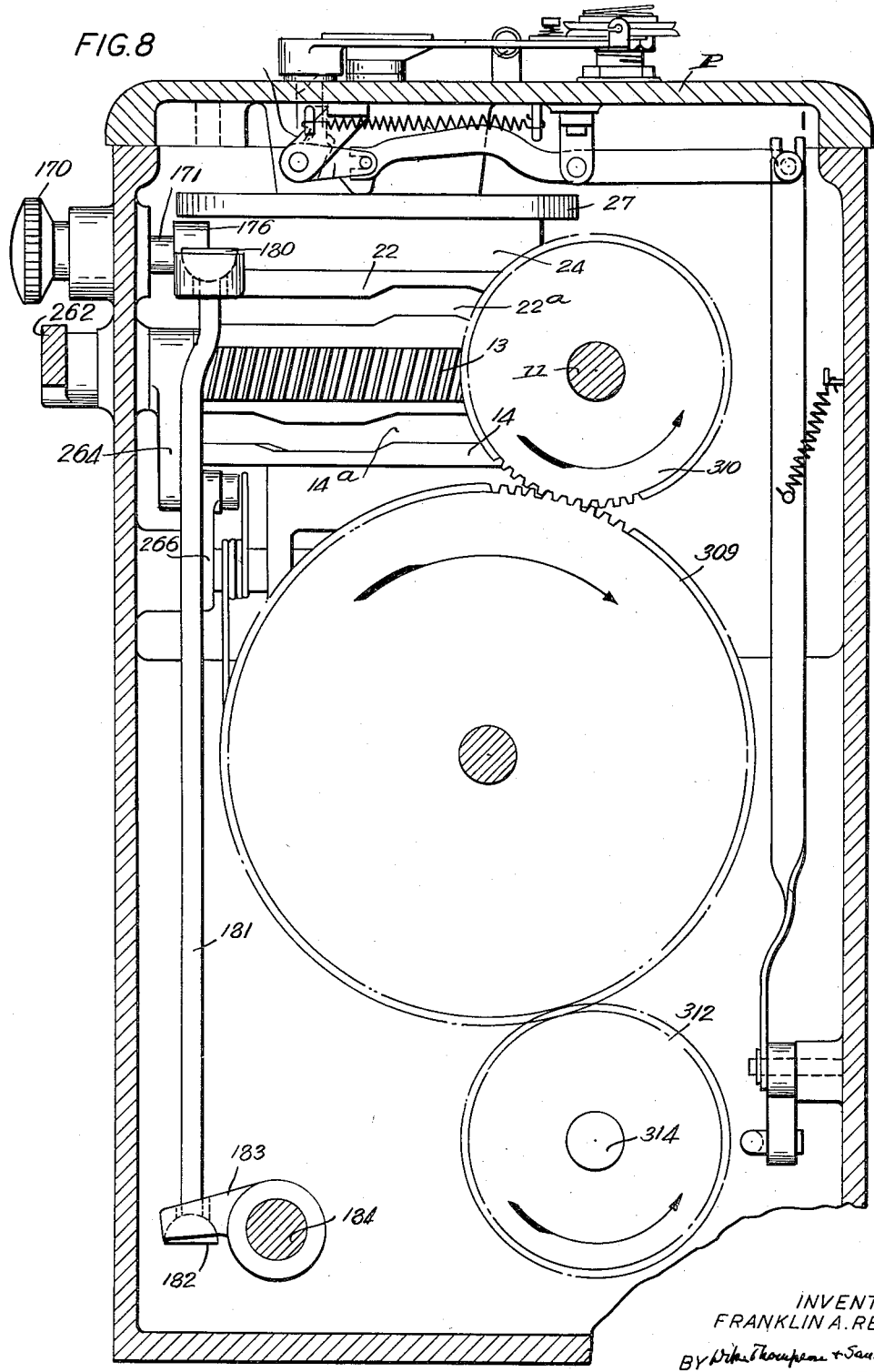

Jan. 31, 1961   F. A. REECE   2,969,755
BUTTON SEWING MACHINE
Filed July 12, 1954   17 Sheets-Sheet 6
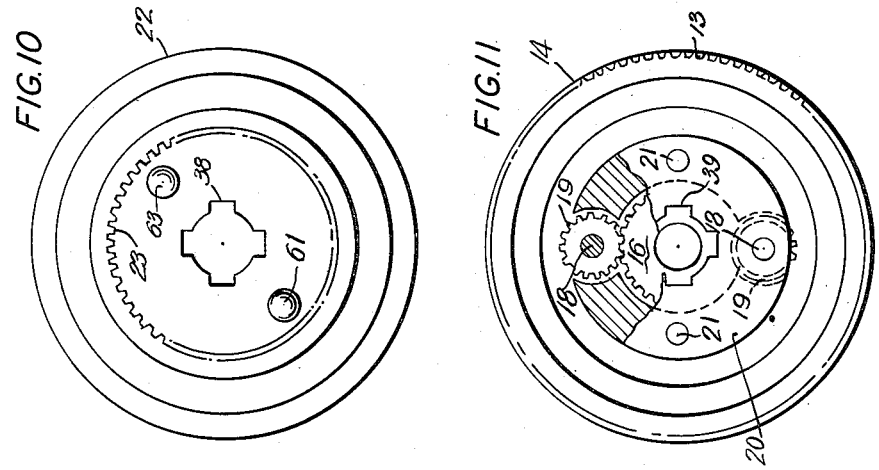
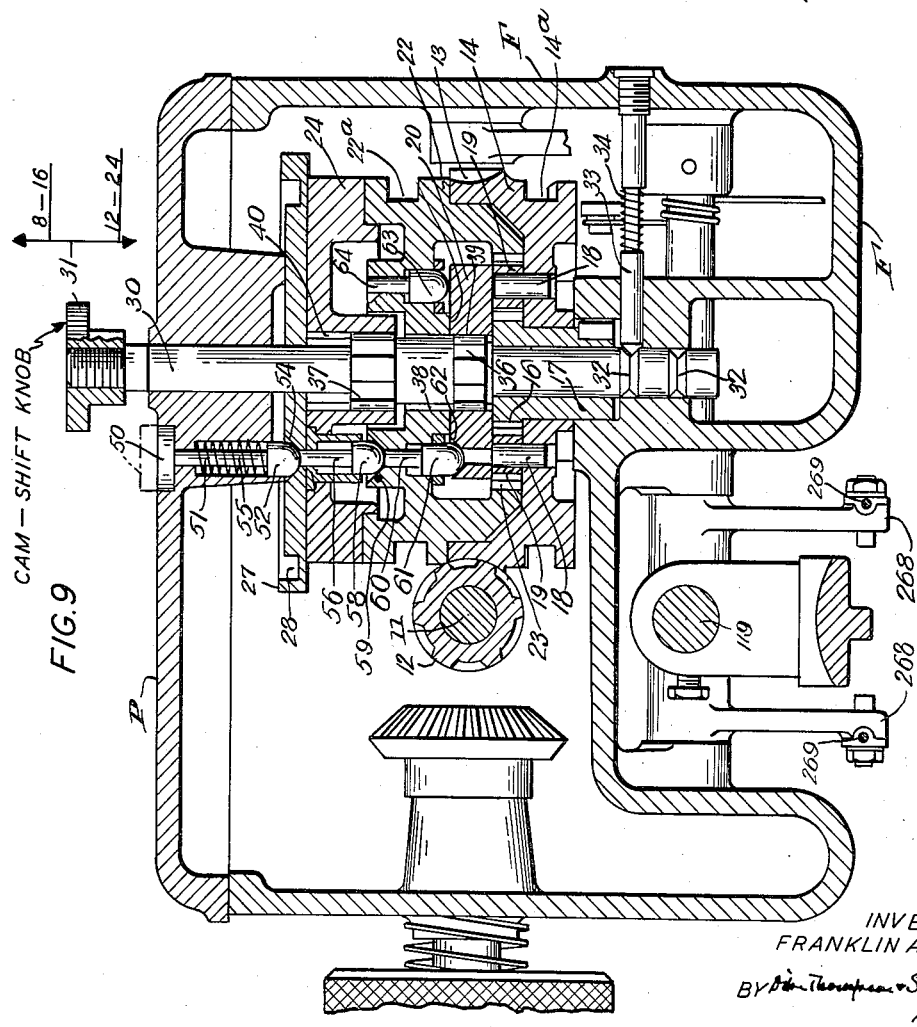
INVENTOR
FRANKLIN A. REECE
BY Thompson & Sanborn
ATT'YS.

Jan. 31, 1961 F. A. REECE 2,969,755
BUTTON SEWING MACHINE
Filed July 12, 1954 17 Sheets-Sheet 7
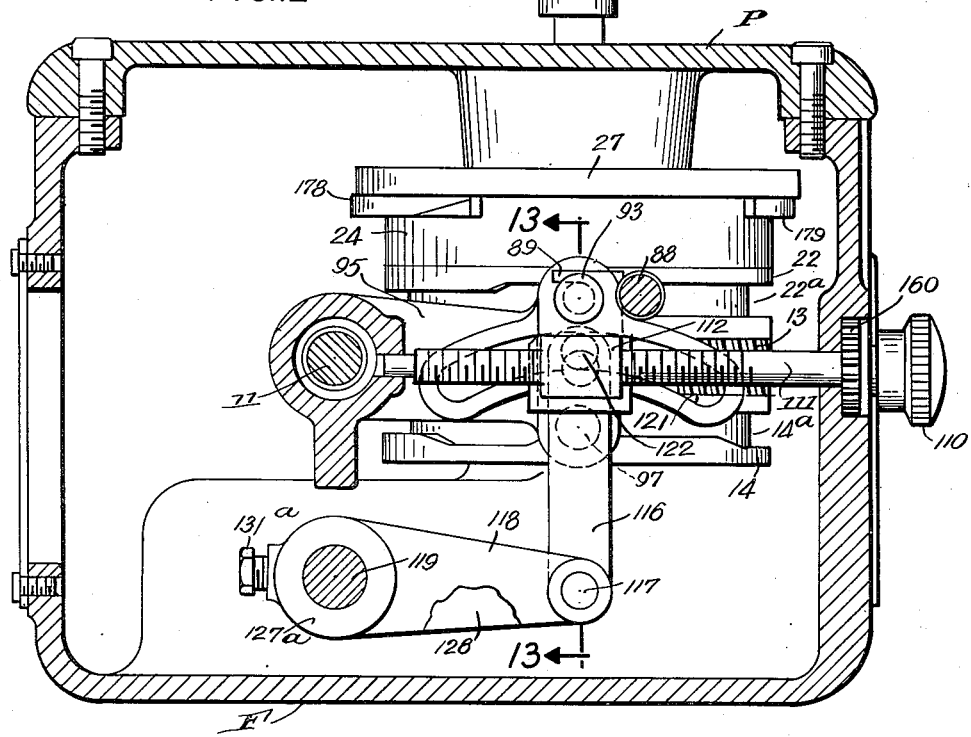
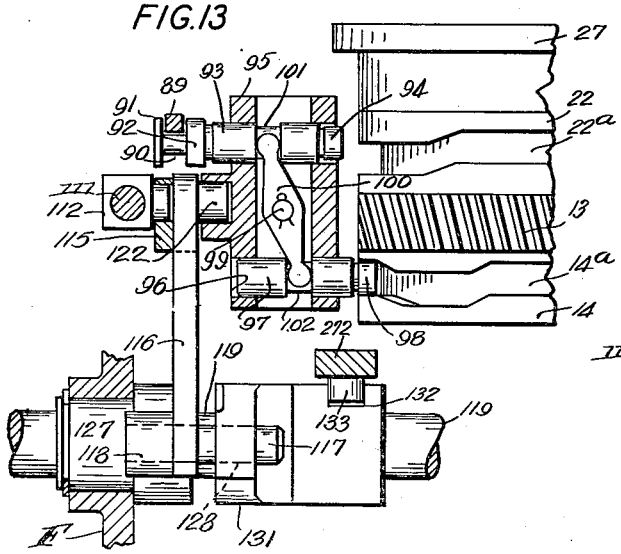
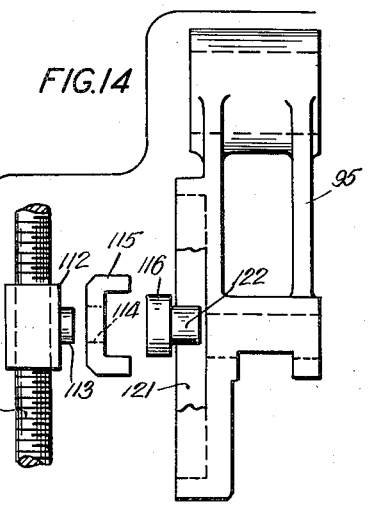
INVENTOR
FRANKLIN A. REECE
ATT'YS.

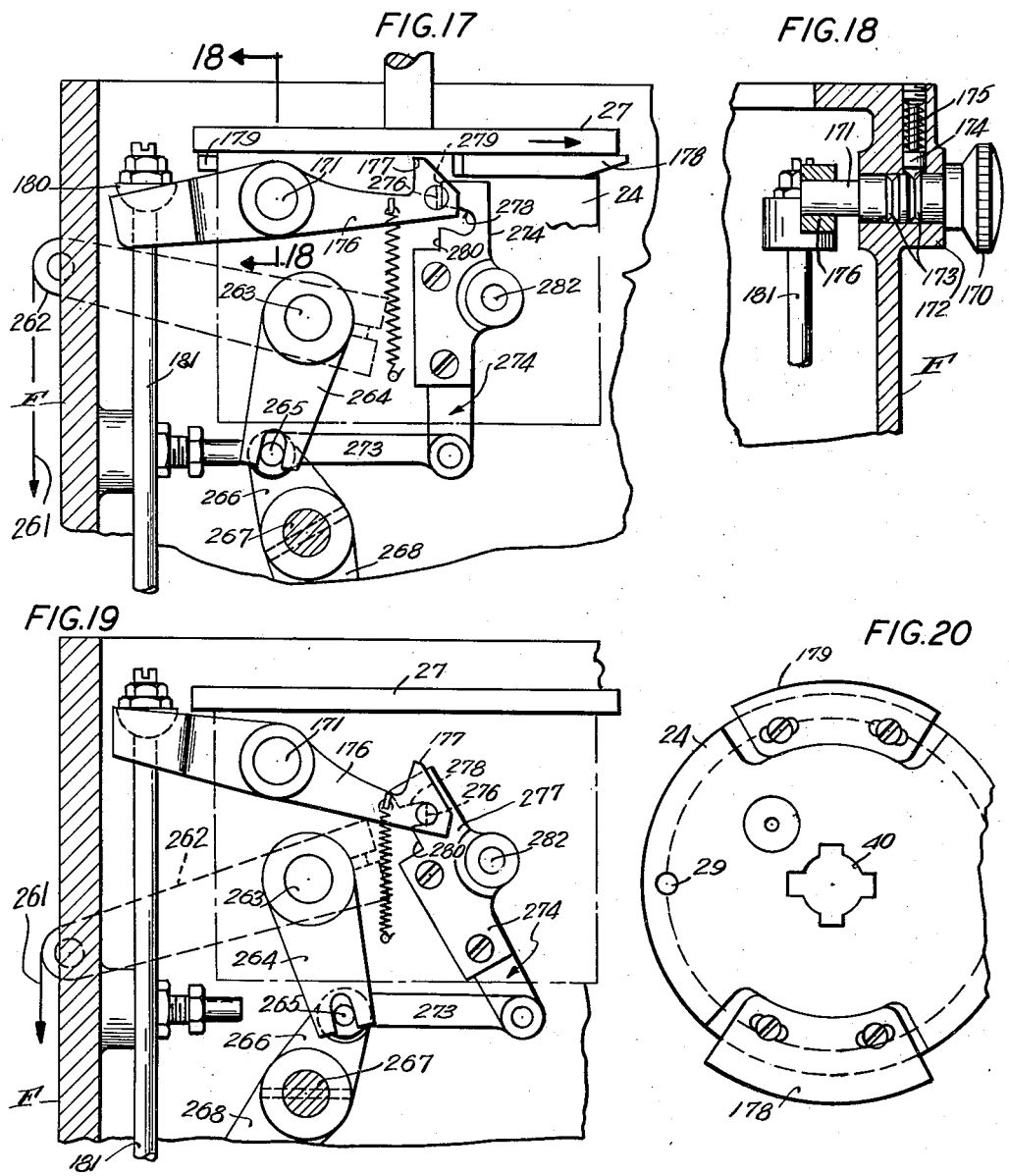
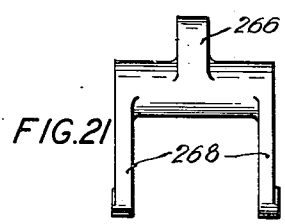

Jan. 31, 1961  F. A. REECE  2,969,755
BUTTON SEWING MACHINE
Filed July 12, 1954  17 Sheets-Sheet 10

INVENTOR
FRANKLIN A. REECE
BY *Dike, Thompson + Jenkins*
ATT'YS.

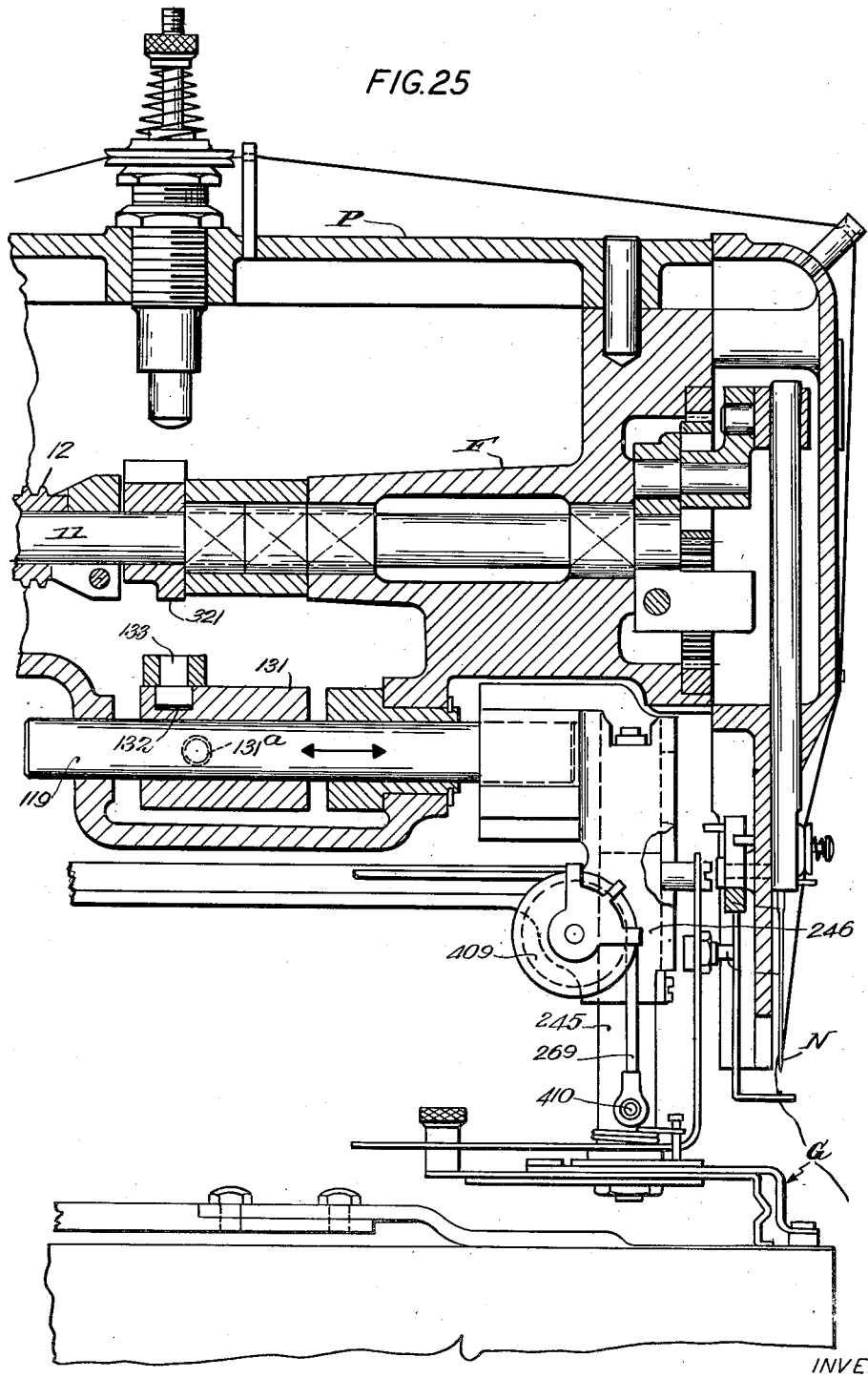

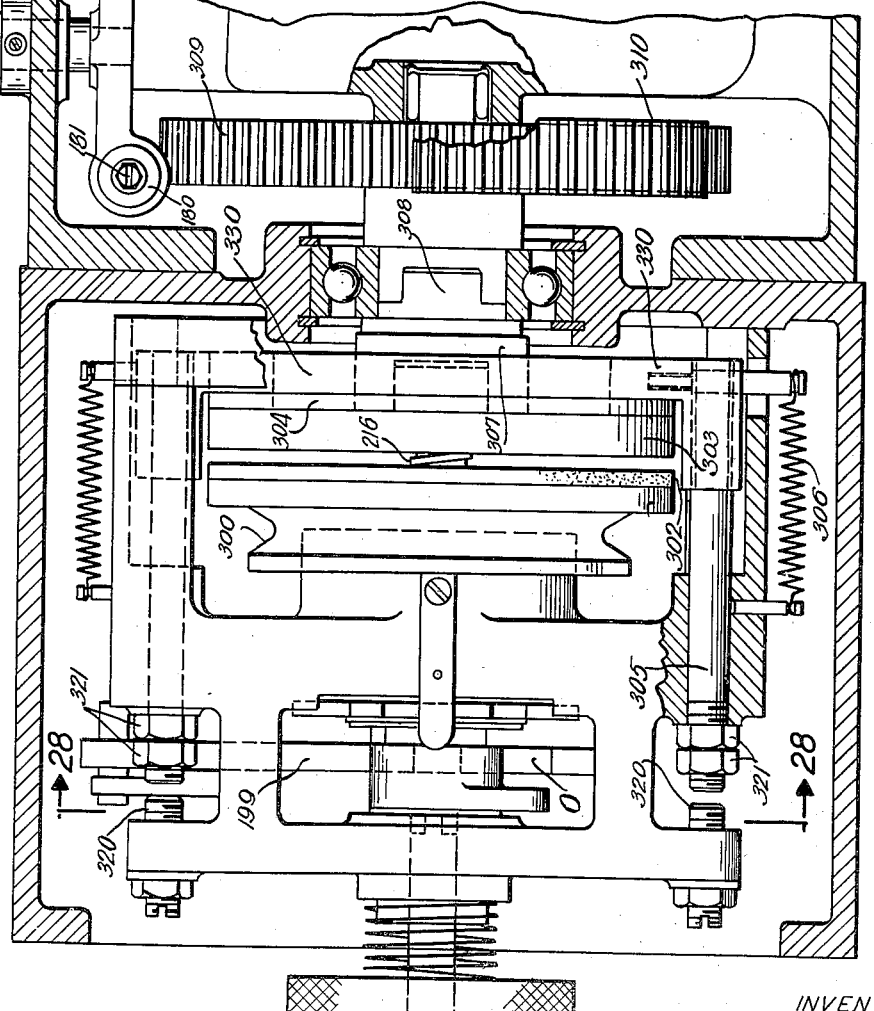

Jan. 31, 1961  F. A. REECE  2,969,755
BUTTON SEWING MACHINE
Filed July 12, 1954  17 Sheets-Sheet 13
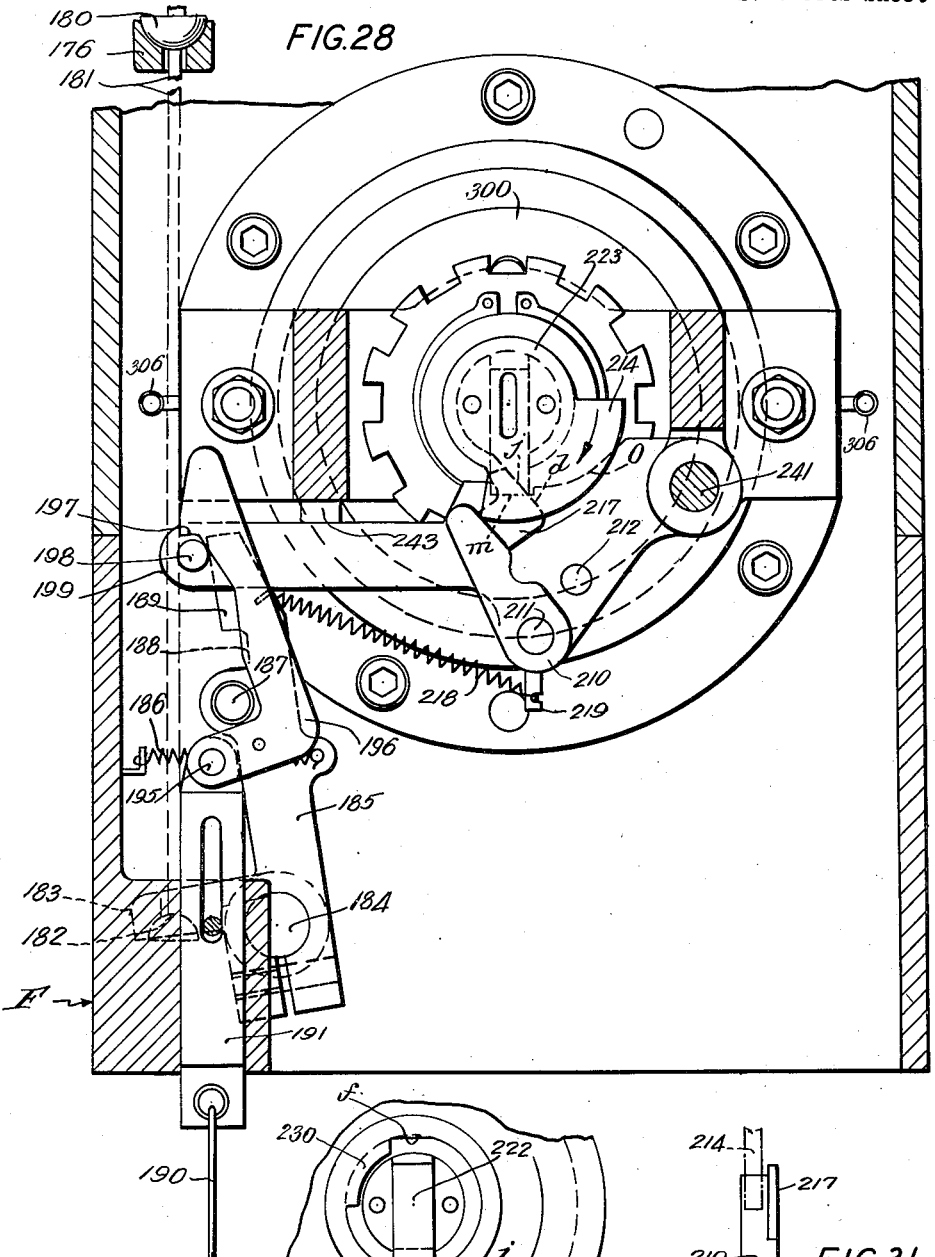
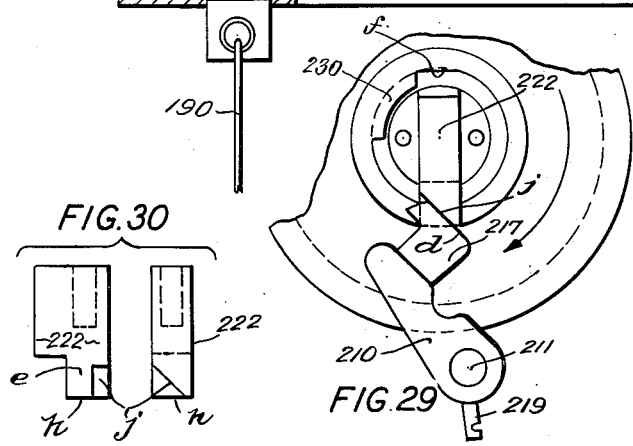
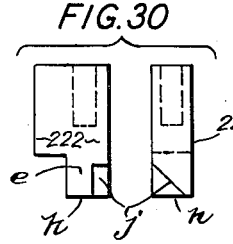
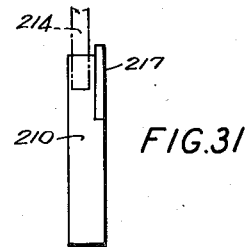
INVENTOR
FRANKLIN A. REECE
BY Diller, Thompson + Sanborn
ATTYS.

Jan. 31, 1961 F. A. REECE 2,969,755
BUTTON SEWING MACHINE
Filed July 12, 1954 17 Sheets-Sheet 14
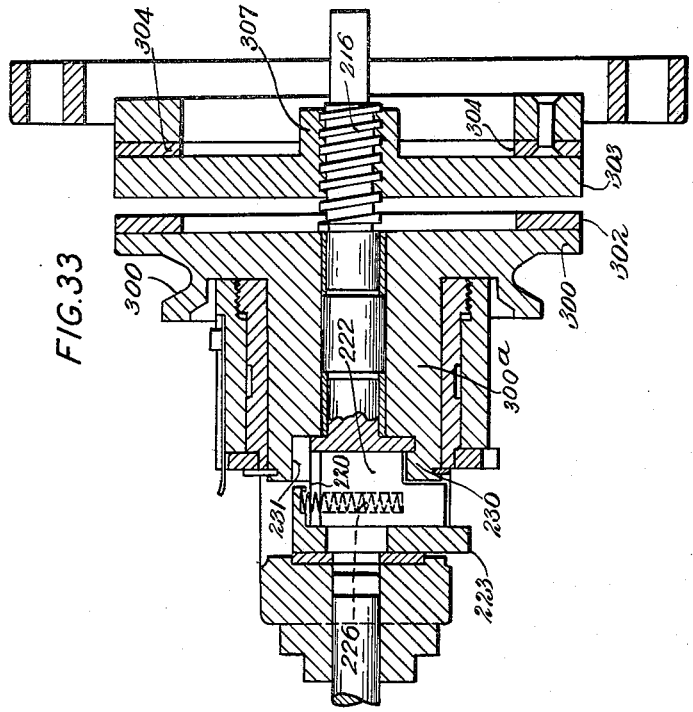
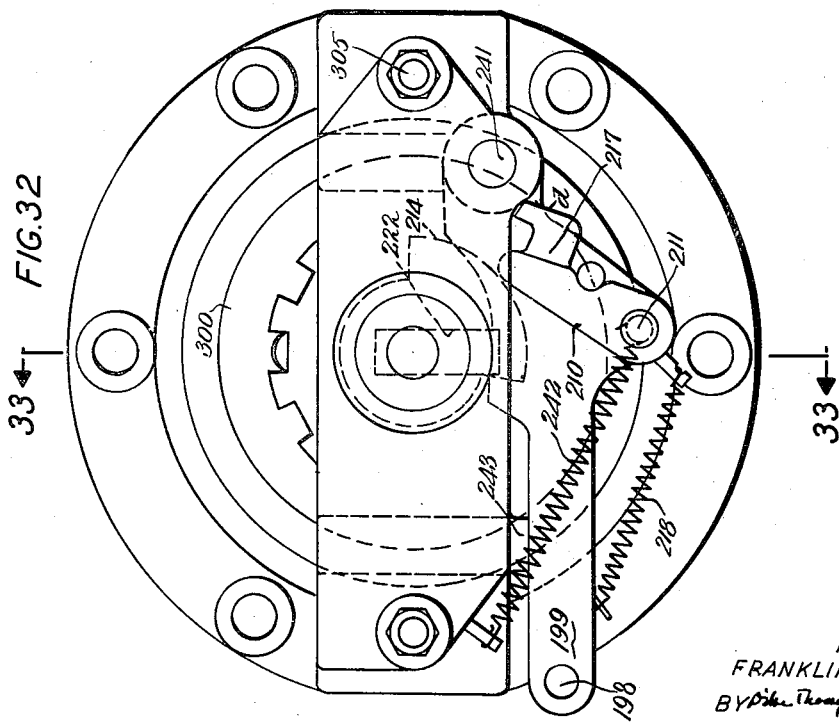
INVENTOR
FRANKLIN A. REECE
BY Pike Thompson + Sanborn
ATT'YS.

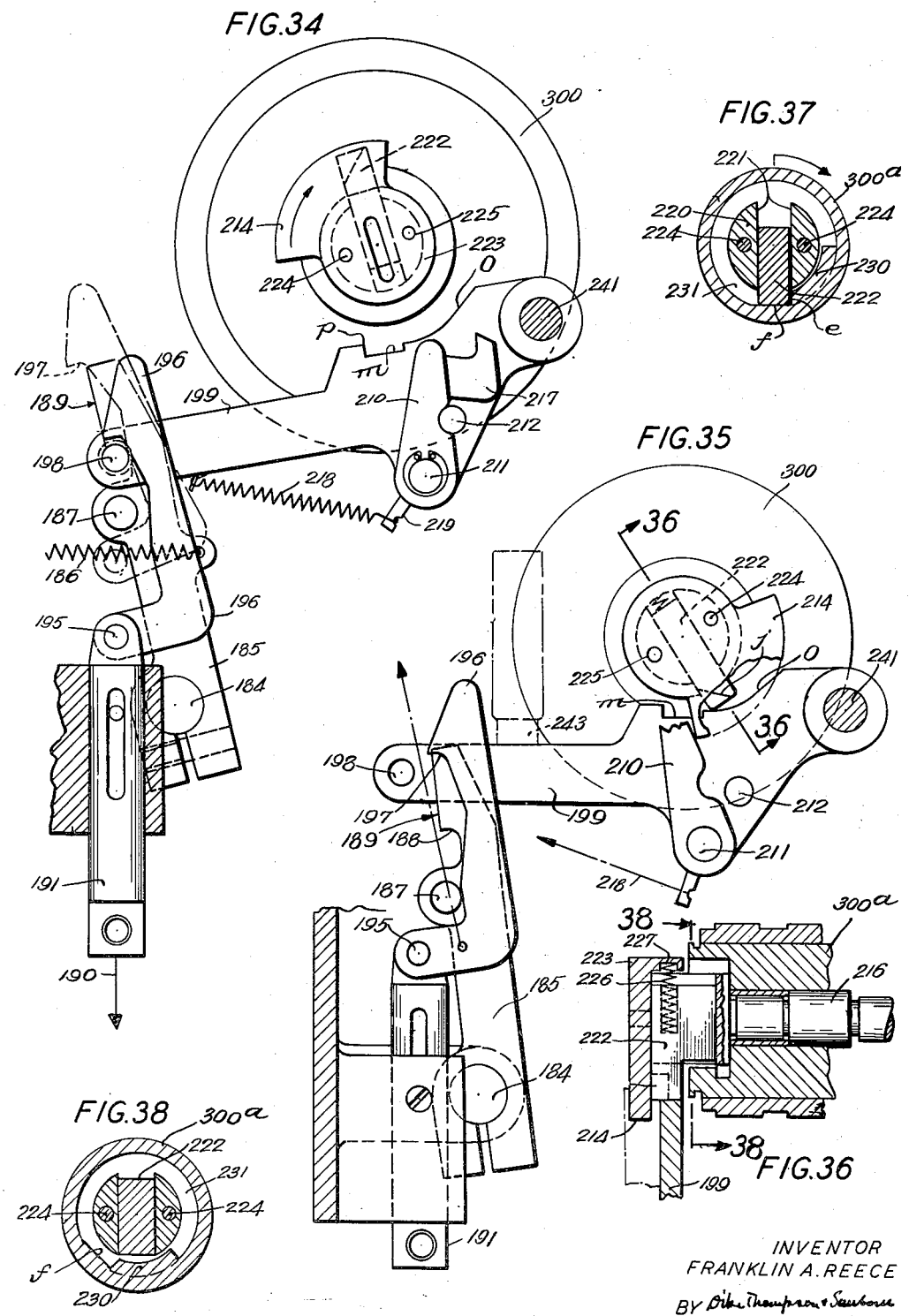

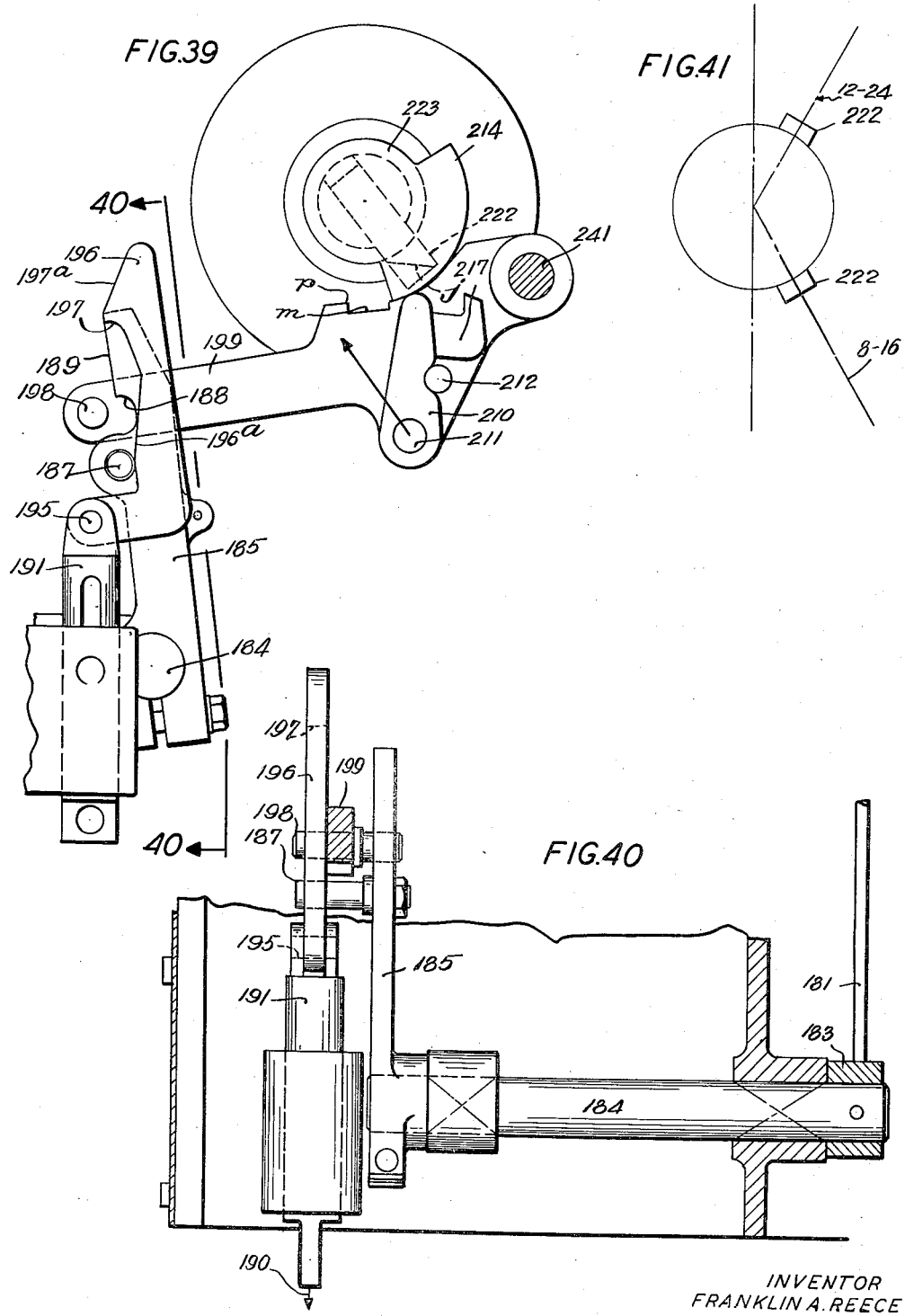

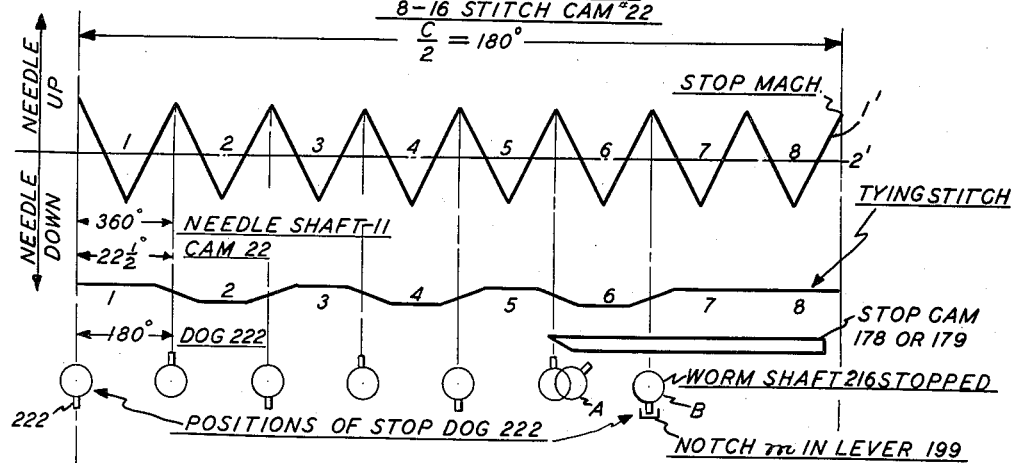
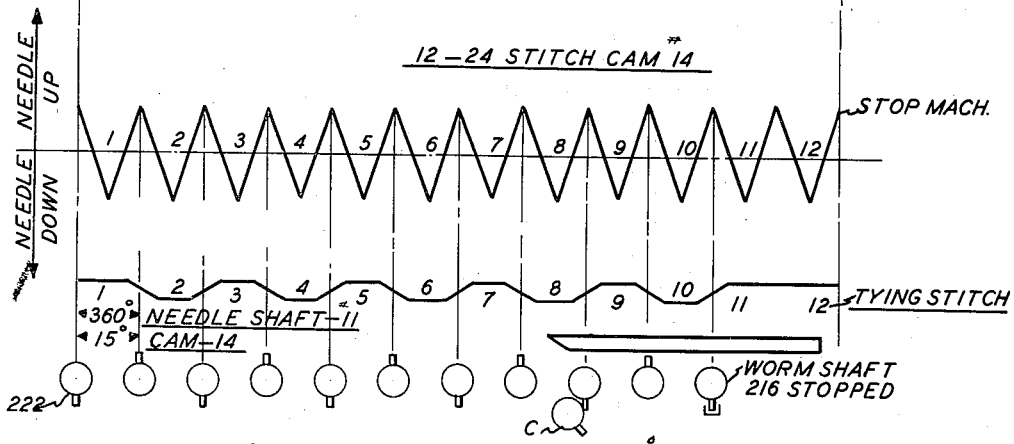

United States Patent Office 2,969,755
Patented Jan. 31, 1961

2,969,755

BUTTON SEWING MACHINE

Franklin A. Reece, Brookline, Mass., assignor to The Reece Corporation, Boston, Mass., a corporation of Massachusetts Filed July 12, 1954, Ser. No. 442,670

57 Claims. (Cl. 112—112)

The present invention relates to a button sewing machine for attaching buttons and the like, and particularly to machines which can be used for a wide range of work.

As is well known to those skilled in the art, buttons of a great variety of shapes and sizes have to be sewn on garments. For instance, in the manufacture of coats, there may be large size buttons to be sewn on the front of the coat, smaller buttons to be sewn on the sleeves and buttons of still a third size at some other place, for instance, on the pockets or under the lapels. Consequently the machine must be capable of quick and easy adjustment to different sizes of buttons.

Also, as is well known, some buttons have two holes and others have four holes and the distances between the holes and the spacing of the holes vary with the size and type of the button. Buttons with four holes usually have the holes arranged in the form of a square, but sometimes, and particularly with oval buttons, the distance between the first and second pair of holes may be different from the distance between the two holes of each pair.

Also, as is well known, a different number of stitches is needed for buttons of different sizes and types. For instance, small buttons with two holes may require eight stitches while larger buttons having four holes may require two groups of eight stitches each. Still other buttons may require one group of twelve stitches or two groups, making twenty-four stitches in all. Also it is necessary to fasten the thread at the end of each group of stitches. In the machine hereafter described, tying stitches are put in at the end of each group of stitches by causing the needle to make one or more, but presumably two, strokes in the same hole of the button.

The machine must be capable of being adjusted to meet each of these varying conditions quickly, easily and without making any mistake which might result in injury to the machine or to the buttons and these adjustments should be made by the operator without the assistance of a service man.

The machine embodying the present invention meets all of these requirements. Accordingly, it is designated to sew (1) A 2-hole button with 8 stitches therein, or
(2) A 2-hole button with 16 stitches therein, or
(3) A 4-hole button with 2 groups of 8 stitches, or
(4) A 2-hole button with 12 stitches therein, or
(5) A 2-hole button with 24 stitches therein, or
(6) A 4-hole button with 2 groups of 12 stitches.

In each case the thread is fastened at the end of each group by a tying stitch.

An adjusting knob is provided by which the machine may be adjusted to sew 2-hole or 4-hole buttons, as is required, and another knob by which the machine may be adjusted for the particular spacing of the holes in the buttons to be sewn and inasmuch as the holes of a 4-hole button are usually located at the corners of a square this adjustment is such that the change in amplitude of movement of the button clamp lengthwise of the machine will equal the change in amplitude of movement of the button clamp crosswise of the machine so that the adjustment in both directions is equal and simultaneous. Also, the machine may be adjusted so that the distance between the first and second pair of holes may be different than the distance between the holes in order that odd buttons may be sewn.

The machine embodying the present invention may be provided with any satisfactory stop motion, but we prefer to use a novel clutch and stop motion which is the subject of a separate application Serial No. 417,009, filed March 18, 1954.

Since the machine is intended to run at extremely high speeds, for instance at 2,000 or more stitches a minute, a certain length of time is required for the action of the stop motion. I have discovered that the stopping can be done while the last stitches are being sewn. Accordingly, the machine is timed to set the stop-motion in action at the beginning of the second stitch before the end of the group of stitches on the completion of which the machine is to be stopped. In practice, where two tying stitches are to be put in, the stop-motion stops the machine while these are being sewn. This arrangement contributes to stopping the machine quietly and without jar and precisely at the right point, that is, with the needle up and out of the work.

Since this machine is designed to run at extremely high speeds, the question of lubrication becomes important. Accordingly, the working parts of the machine are enclosed in an oil-tight casing or frame and all changes and adjustments which have to be made during the operation of the machine are effected by knobs on rods extending through the casing to the outside.

Accordingly, the present invention has to do particularly with (1) the mechanism for shifting cam followers when it is required to sew buttons with different numbers of stitches; (2) the mechanism for adjusting the machine to sew buttons having the holes spaced differently; (3) the mechanism for adjusting simultaneously the stitch length and spacing between groups; (4) the cam changing signal and mechanism for showing the operator that the parts are in proper positon for changing; (5) the mechanism for changing from 2-hole to 4-hole buttons; (6) the stopping and starting control mechanism; and (7) the method of stopping abruptly a rotating member of the machine having its mass concentrated about its axis before the end of the stitching of a group of stitches is reached and then setting in operation the brake mechanism for the machine by the sudden stopping of the rotating member.

It will be understood that it is not intended to limit this patent in any way except as specifically stated in the claims since it will be obvious that the improvements covered hereby are capable of other embodiments.

Notwithstanding the complicated structure of the machine resulting from the variety of functions to be performed by the several elements and their necessary interaction, the machine is extremely compact and can be changed almost instantly and by the operator to operate on different kinds of work.

Fig. 1 is a side elevation of the machine.

Fig. 2 is a top plan view of the machine.

Fig. 3 is a plan view of a small 2-hole button such as a shirt button.

Fig. 4 is a plan view of a large 4-hole button such as a coat button.

Fig. 5 is a plan view of an oval button with the distance between the first and second pair of holes less than the distance between the holes in each pair.

Fig. 6 is a top plan view with cover removed.

Fig. 7 shows the mechanism for raising the button clamp.

Fig. 8 is a section on line 8—8 of Fig. 2.

Fig. 9 is a section on line 9—9 of Fig. 1.

Fig. 10 is a bottom plan view of the 8—16 cam 22.

Fig. 11 is a top plan view of the 12—24 cam 14, some parts being broken away.

Fig. 12 is a section on line 12—12 of Fig. 2 showing the stitch length adjusting mechanism.

Fig. 13 is a section on line 13—13 of Fig. 12 and shows the mechanism for shifting the cam followers.

Fig. 14 is an exploded view of a portion of the stitch length adjusting mechanism.

Figs. 17 and 19 are details showing two positions of the trip lever 176.

Fig. 18 is a section line 18—18 of Fig. 17 showing group selection knob 170.

Fig. 20 is a plan view of the trip cams 178 and 179.

Fig. 21 is a detail view of the lever 266 shown in Figs. 17 and 19.

Fig. 25 is a section on line 25—25 of Fig. 6.

Fig. 26 is a plan view of the clutch and stop motion, certain parts being broken away.

Fig. 27 is a modification of the clutch members.

Fig. 28 is a section on line 28—28 of Fig. 26.

Figure 15:
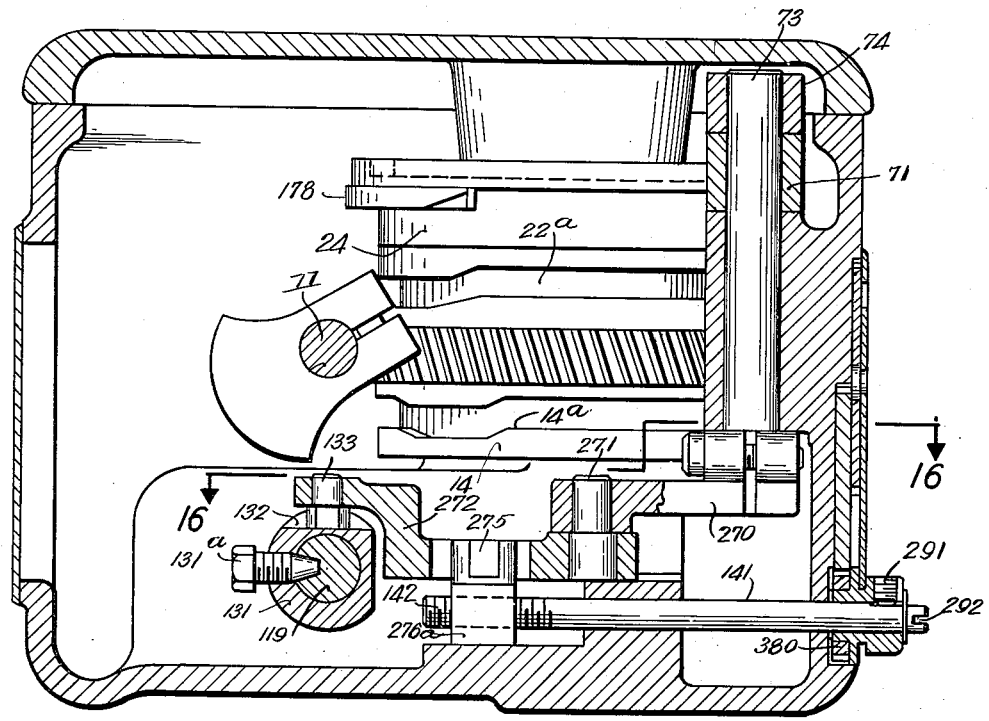
Fig. 15 is a section on line 15—15 of Fig. 6.

Figs. 29 and 31 are details showing the relation of the hook 217 and driving dog 222.

Fig. 30 shows the driving dog in detail.

Fig. 32 is an end elevation of the clutch and stop motion.

Fig. 33 is a section on line 33—33 of Fig. 32.

Fig. 34 shows the parts shown in Fig. 28 but with the sector 214 and the driving dog 222 out of contact with the release lever 199.

Fig. 35 shows the same parts with driving dog 222 in contact with the cam surface on the release lever 199.

Fig. 36 is a section on line 36—36 of Fig. 35.

Fig. 37 is a section showing driving dog 222 in engagement with the driving lug 230 and in driving position.

Fig. 38 is a view similar to Fig. 37 taken along section line 38—38 of Fig. 36 showing the driving dog 222 disengaged from driving lug 230.

Fig. 39 is a view similar to Fig. 34 showing the parts immediately before tying stitches are put in.

Fig. 40 is a section on line 40—40 of Fig. 39.

Fig. 41 is a diagram showing the differing positions of the driving dog 222 in sewing 8—16 and 12—24 buttons.

Fig. 42 is a diagram showing successive relative positions of some of the working parts.

*General organization of the machine*

In the drawings, the frame of the machine is designated F (see Fig. 1), the cover plate P, the needle N, and the button clamp G.

The needle, except for its up and down movement, is stationary and the button clamp G is arranged to reciprocate or vibrate laterally of the machine between the two holes A and B of a 2-hole button, see Fig. 3, or C—D and E—F of a 4-hole button, see Fig. 4; also to shift forward to position the button clamp for a second group of stitches, including a tying stitch or stitches. There is no vibratory movement of the button clamp while the tying stitches are being put in, so that they are put in the same hole. The button clamp is also arranged to be lifted when the work is to be inserted. The machine can also be adjusted to sew an oval button, (see Fig. 5), with the distance between the holes S and T, constituting the first pair of holes, greater than the distance between the holes U and S, one of which is in each pair of holes.

The machine is provided with two stitch cams 14 and 22 (see Fig. 9) having cam grooves 14a and 22a which cooperate with cam followers 98 and 94, see Fig. 13. Each cam is laid out (see Fig. 42) to put in two groups of stitches with a tying stitch or stitches at the end of each group. Cam 14, known as the 12—24 cam, will put in two groups of twelve stitches in a 4-hole button, or one group of twelve stitches in a 2-hole button, or twenty-four stitches in a 2-hole button. Cam 22, known as the 8—16 cam, will put in two groups of eight stitches in a 4-hole button or eight stitches in a 2-hole button, or sixteen stitches in a 2-hole button. When a 2-hole button is to be sewn with eight stitches, the stitch cam 22 makes one-half a revolution, putting in eight stitches with appropriate tying stitches at the end of the group, and then the machine is stopped, or if a 2-hole button is to be sewn with twelve stitches, the stitch cam 14 makes a half revolution, putting in a group of twelve stitches. The machine can then be started again and a second button sewn, during which the appropriate stitch cam 22 or 14 makes the other half of its revolution and the machine is stopped, putting in one or more tying stitches before it stops. Also, the machine cam be adjusted so that it will not stop in the middle of the revolution of the stitch cam and the button clamp will not be shifted. In this case, sixteen or twenty-four stitches will be put in a 2-hole button. When a 4-hole button is sewn, the cam, 14 or 22, does not stop until a complete revolution has been made. Mechanism is provided by which the machine will stop at the end of the first group of stitches or at the end of the second group of stitches. When stopped at the end of one group of stitches, a new button is inserted, and this button is sewn by the second half of the stitch cam.

The machine also includes a cam 27 (see Figs. 6 and 9), known as the 4-hole cam, which shifts the button clamp C forward between groups of stitches when a 4-hole button is being sewn, and a rotating trip cam carrier 24 which operates the trip lever 176 (see Figs. 17, 19 and 22), and consequently the stop motion on completion of a 2-hole or a 4-hole button as the case may be. The machine is provided with four adjusting knobs, viz., the cam shift knob 31 (see Figs. 1, 2 and 9), by which the cam 27 is connected to either cam 14 or cam 22; the group-selection knob 170 (see Figs. 1, 2, 6 and 8) which determines whether the machine will stop after one or two groups of stitches have been put in; the cam follower shift knob 87 (see Figs. 1, 2 and 6) which simultaneously withdraws a cam follower 94 or 98 (see Fig. 13) from one stitch cam and inserts the other in the groove of the other stitch cam; and a stitch length knob 110 (see Figs. 1, 2, 6 and 12) by which the length of the stitches which are put in may be varied to compensate for different lateral distances between holes in buttons of different size and also simultaneously change the extent of movement of the button clamp forward and back to provide for the different distances between groups of stitches in 4-hole buttons of different sizes. There is also a 4-hole lever 78 (see Figs. 2, 6, 22, 23 and 24) to change the machine for operation on 2-hole or 4-hole buttons respectively. In addition to the four adjusting knobs, means is provided by which the spacing between the two pairs of holes of a 4-hole button may be changed without changing the spacing between the holes of each pair, this being necessary for certain types of buttons.

The machine also includes a novel stop motion which brings the machine to a gentle stop at the appropriate time and makes it possible to run it at extremely high speeds.

The machine is operated by two treadles, a starting treadle 190a (see Fig. 1) which is depressed to start the machine, and a button clamp treadle 260, which raises the button clamp C to allow the work to be inserted. After this the two stitch cams 14 and 22 and related parts make a one-half revolution, or a complete revolution, putting in one or two groups of stitches with tying stitches at the end of each group and the machine stops. The two pedals and parts operated thereby are interconnected in such a way that the machine cannot be started until all of the parts are in proper position and the button clamp cannot be raised when the stitching is taking place. Thus there is no danger of breakage or of defective work.

*Mechanism for driving the stitch cams and for changing from one to the other*

At 11 is shown the needle drive shaft (see Figs. 6, 8 and 9) driven from a suitable source of power, for instance, a constantly running belt pulley 300 (see Fig. 26), there being a suitable clutch and stop motion associated with it. These parts are described in detail hereafter. The needle drive shaft 11 has on it a worm 12 which meshes with a worm gear 13 cut in the periphery of the 12—24 cam 14, the cam-track of which is designated 14a. This cam 14 revolves about the same axis as a fixed gear 16 mounted on a hub 17 keyed to the frame F of the machine. The cam 14 carries two studs 18 on which are mounted pinions 19. Above the pinions 19 is a cover plate 20 fixed to the cam 14 by pins 21 (see Fig. 11).

The 8—16 cam 22 (see Figs. 9 and 10), has a suitable cam track 22a and is formed with an internal gear 23 which meshes with pinions 19. Above the 8—16 cam 22 and resting on it is a circular member 24 called the trip cam carrier which operates the stop motion at appropriate times through mechanism to be described. On its periphery are two trip cams 178 and 179, (see Figs. 12, 15, 17 and 20), the purpose of which will be explained hereafter. Above the trip cam carrier 24 is the 4-hole cam 27 which has a cam groove 28 (see Fig. 6) and is caused to rotate with the trip cam carrier 24 by a dowel pin 29 (see Fig. 6), projecting upwardly from the trip cam carrier and received in a suitable hole in the 4-hole cam 27. The 4-hole cam 27 is the source of motion to produce two groups of stitches for a 4-hole button.

Slidable vertically in the hub 17 of the fixed gear 16 and in the frame F of the machine is a spline stitch cam shaft 30 having on its upper end the cam-shift knob 31 and near its lower end two grooves 32—32. These grooves receive a pointed detent 33 which is actuated by a spring 34. The grooves 32 and the detent 33 serve to indicate to the operator the two vertical positions of the shaft 30 and also prevent the shaft from getting out of position during the operation of the machine. The stitch cam shaft 30 carries two sets of splines, the lower 36 and the upper 37. The 8—16 cam 22 is provided with a splined hole 38 extending centrally therethrough and the cover plate 20 on the 12—24 cam 14 is provided with a splined hole 39 extending centrally therethrough and coaxial with the hole 38. The lower set of splines 36 on shaft 30 is adapted to be selectively engageable in one of the splined holes 38 or 39. The hub of trip cam carrier 24 is provided with a central splined hole 40 which is coaxial with the holes 38 and 39 and of such a length that the upper set of splines 37 will be in engagement therewith in both vertical positions of the shaft 30.

Therefore, when the stitch cam shaft 30 is in its lowest position, as shown in Fig. 9, the detent 33 is in the upper groove 32 and the spline 36 engages the splined hole 39 in the cover plate 20, which turns with the 12—24 cam 14. Under these conditions the drive is from the worm 12 to the worm gear 13, and the cam 14 carries the pinions 19 and cover plate 20 around with it, and through the upper spline 37 of the shaft 30 engaged in the lower portion of the splined hole 40 rotates the trip-cam carrier 24.

When the operator wishes to sew a button with two groups of eight stitches, or a single group of sixteen stitches in a 2-hole button, the knob 31 and the stitch cam shaft 30 are pulled up until the detent 33 engages the lower groove 32. At the same time this moves the lower splines 36 into the hole 38 in the 8—16 cam 22 and the upper spline 37 is slid to a higher location in the splined hole 40. When the parts are in this position the drive is as follows: The worm 12 drives the worm gear 13 on the 12—24 cam 14, and the rotation of this cam 14 carries the pinions 19 around the fixed gear 16, causing them to rotate. The rotation of pinions 19 turns the 8—16 cam 22 at the proper increased speed to cause sixteen needle thrusts in a revolution. The cam 22 carries the trip cam carrier 24 and 4-hole cam 27 about with it. Thus, by shifting the position of the splined stitch cam shaft 30 up or down as required, the 8—16 cam 22 or the 12—24 cam 14 can be connected alternately with the cam 27, and the trip cam carrier 24 and the 4-hole cam 27 will be driven at the proper speed.

*Mechanism for shifting cam followers*

The two stitch cams 14 and 22 (see Figs. 12 and 13), one of which is inoperative when the other is connected for operation, are provided with two cam followers 94 and 98, 98 being for the groove 14a of the 12—24 cam 14 and 94 being for the groove 22a of the 8—16 cam 22. To change the operation from one cam to the other, cam follower 98 is withdrawn from the groove 14a of the 12—24 cam 14, and cam follower 94 is inserted in the groove 22a of the 8—16 cam 22. This is accomplished by the cam follower shift knob 87 (see Figs. 1, 2 and 6), which may be pulled out or pushed in to shift the cam followers. The knob 87 is secured to a rod 88 carrying arm 89 (see Figs. 6 and 13), engaging a groove 90 formed between a head 91 and a shoulder 92 on the rod 93, on the end of which is cam follower 94 for the 8—16 cam 22. This rod 93 is movable in and out in a member 95. Also located in a hole 96 in the member 95 is another rod 97 on the inner end of which is cam follower 98 for the 12—24 cam 14. A swinging lever 100 having rounded ends engaging grooves 101 and 102 in the two cam follower rods 93 and 97, respectively, is also pivoted on the member 95 at 99. When the knob is pulled out and is in the position shown in Fig. 13, the cam follower 94 is withdrawn from groove 22a in the 8—16 cam 22, rendering that cam inoperative. Simultaneously the cam follower 98 is pushed into the cam groove 14a of the 12—24 cam 14 and this cam becomes operative.

*Cam changing signal*

To indicate to the operator when the parts of the machine are in proper position to permit a shift from one cam to the other, a signal 50 (see Figs. 2 and 9) is provided which, in the form shown in the drawings, is a cap, received in a corresponding depression in the top surface of the top plate P of the machine. In practice the edge of this signal is painted red and is noticeable whenever it is in the raised position, as shown by the dot-and-dash lines in Fig. 9, but is not visible to the operator when in the lowered position. The signal 50 is on the upper end of a pin 51 having on its lower end a rounded head 52 which can rest in a depression 54 in the top surface of the 4-hole cam 27. The rounded head 52 rests on the upper end of a similar pin 56 (see Fig. 9), also having a rounded head 58 received in a depression 59 in the top surface of the 8—16 cam 22. The head 58 rests in turn on a similar pin 60 having a rounded head 61 engaging a depression 62 in the cover plate 20, which in effect is a part of the 12—24 cam 14. The signal 50, together with the pins 56 and 60, are held down by a spring 55. The cam 22 also carries another pin 64 having a head 63, this pin being located at 180° from the pin 60.

Cam 14 rotates 180° for twelve stitches (see Fig. 42), including the tying stitches, and the machine may be set to stop at this point, the position of stopping being controlled by the trip cams on the trip cam carrier 24 which rotates in unison with the 12—24 cam 14.

Cam 14 rotates 360° for twenty-four stitches including the tying stitches at the end of the first twelve stitches and again at the end of twenty-four stitches. Cam 14 turns 180° while cam 22 turns 270°, and while cam 14 turns 360°, cam 22 turns 540°, or one and one-half turns. The 4-hole cam 27 rotates in unison with cam 14 and shifts the button clamp G forward with respect to the needle between the two groups of stitches when a 4-hole button is being sewn. By reason of the gearing explained, cam 27 is in correct relationship with cam 22 either to stop the machine at the end of eight or sixteen stitches, or, in the case of a 4-hole button, to shift the relative position of the button clamp and needle between the two groups of stitches.

Assuming that the machine is adjusted to sew twenty-four stitches in a 4-hole button, and that cam 27 is connected to cam 14, the machine is started and cam 14 makes a full revolution and the machine puts in twenty-four stitches. During this time, cam 22 makes one and one-half revolutions, which causes end 63 of plunger 64 to fall into the depression 62 of cover plate 20 (see Fig. 9), which in turn allows end 58 of plunger 56 to fall into the depression 59 and therefore allows pin 51 to drop so that signal 50 is down and does not show red because it is concealed, indicating to the operator that a shift can then be made from cam 14 to cam 22.

When the spline shaft 30 is in its lower position so that the machine is adjusted to sew twelve stitches in a 2-hole button, cam 14 and cam 27 will turn 180° and cam 22 will turn 270°. As there is only one depression 62 in cover plate 20, the signal 50 cannot drop down but will show red, indicating that the operator should not attempt to change cams. No change could be made anyway as spline 36 would not register with splined hole 38, but it saves time for the operator to know just when a change can or cannot be made.

Now assume that the machine has been adjusted to sew sixteen stitches in a 4-hole button and that it is decided to shift to sew twenty-four stitches in a 4-hole button and also that, at the start of sewing the last sixteen stitches, cams 14, 22 and 27 were in correct position for the shift from cam 22 to cam 14. During the sewing of these last sixteen stitches, cams 22 and 27 make one revolution while cam 14 turns 240°. The end 61 of plunger 60 will ride on top of cover plate 20 and plunger 60 will prevent end 58 of plunger 56 dropping into depression 59 and in turn will hold signal 50 up, thus displaying the red signal indicating that no change can be made. If a change could be made at this time, cam 27 would be out of position with respect to cam 14 by 60° (see Fig. 42), thus misplacing both the tying stitches and the stop position. To correct this condition, the machine is started and allowed to make an idle cycle, during which cams 22 and 27 make one revolution while cam 14 turns 240 degrees. When this cycle has been completed, neither plunger 60 nor 64 registers with depression 62, and therefore signal 50 remains up indicating that an idle cycle is required to bring the parts into position for the shift. Upon completion of the second idle cycle, cams 22 and 27 will each have made three revolutions (including the last sewing cycle), cam 14 has made two revolutions, and the three cams are then brought to the position shown in Fig. 9, with the signal 50 down, indicating that the parts are in correct position for shifting.

Since the machine makes a revolution in about one-half second, the procedure described restores the machine almost instantaneously to the proper position for shifting cams. When the red signal is up, the operator has only to re-start the machine and re-start it again until the red signal disappears, when she knows the machine is in position for shifting cams. The signal shows the operator just when the shift can be made and eliminates time consuming trial and error effort.

Not only does the cam signal indicate the proper position for shifting from cam 22 to cam 14, or vice versa, but also it indicates that cam followers 94 and 98 may be shifted into or out of their respective cam grooves 22a and 14a, respectively. Since cam followers 94 and 98 are a fixed distance apart, the portions of the cam grooves 22a and 14a which are to be entered by the cam followers must be the same distance apart at the time when the change of cam followers is made, and consequently the cams must be in the proper angular position. When the signal shows that the cams are in position so that cam shift knob 31 and shaft 30 may be raised or lowered, as the case may be, it also indicates that the cam followers 94 and 98 may be shifted.

*Mechanism for vibrating the button clamp and to move it forward between groups of stitches in 4-hole buttons*

Button clamp G is reciprocated or vibrated sidewise when sewing 2-hole buttons and is shifted forward between the two groups of stitches when sewing 4-hole buttons.

The button clamp G (see Figs. 1 and 7) is carried on a post 245 which is slidable and spring depressed in part 246 and which in turn is secured to button clamp shaft 119 (see Fig. 25). This shaft slides back and forth in suitable parts of the frame F to shift the button clamp forward between groups of holes and oscillates to position the holes crosswise.

The cam followers 94 and 98 are mounted and slidable in a member 95 which has an arcuate groove 121 (see Fig. 12) in which is a stud 122 secured to the upper end of a link 116. Whichever cam follower 94 or 98 is engaged in its appropriate cam groove 22a or 14a swings the arcuate member 95 up and down about the needle shaft 11 on which it is loosely mounted. The lower end of link 116 is connected by a pin 117 to the ends of two arm 118 and 128 (see Fig. 16), the arm 128 being slidable on pin 117. Arm 128 has a hub 131 secured to the button clamp shaft 119 by a set screw 131a. The other arm 118 is formed with a hub 127 having a tubular extension 127a which is rotatably mounted in a projection forming part of the frame F of the machine and is held from axial movement by a split ring 127b. Therefore, the swinging movement of the arcuate member 95 on the needle shaft 11 moves link 116 up and down and this in turn moves both arms 118 and 128 up and down and consequently oscillates the clamp shaft 119 to vibrate the button clamp G with respect to the needle N and also allows the clamp shaft 119 to slide lengthwise to shift the button clamp forward between groups of stitches in a 4-hole button.

Figure 22:
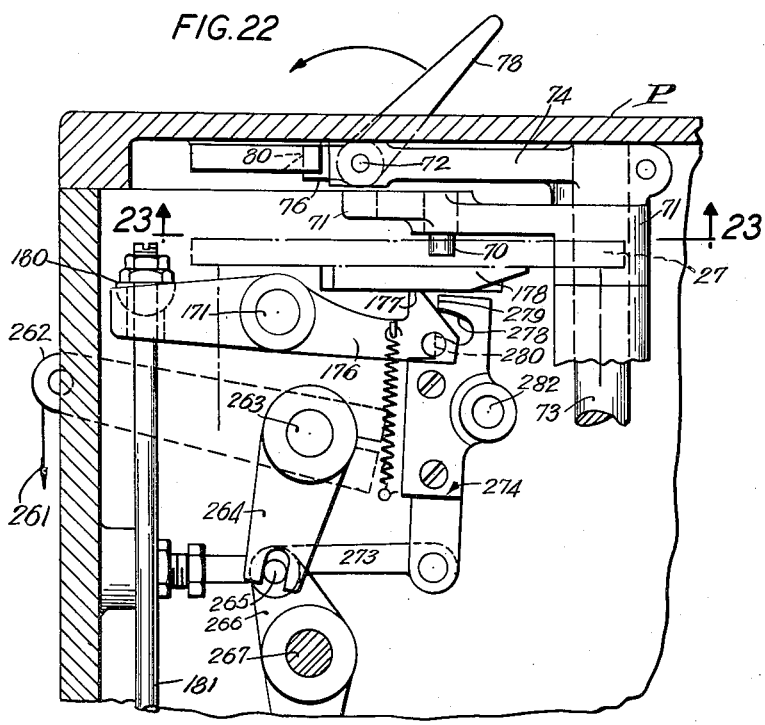
Fig. 22 is a section on line 22—22 of Fig. 6 showing the mechanism for adjusting the machine to sew 2 or 4-hole buttons, respectively.
Figure 23:
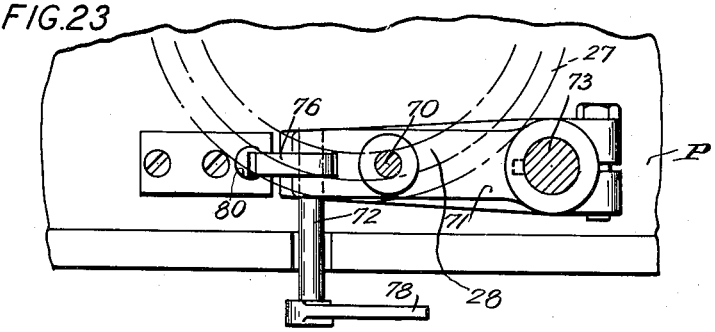
Fig. 23 is a section on line 23—23 of Fig. 22.
Figure 24:
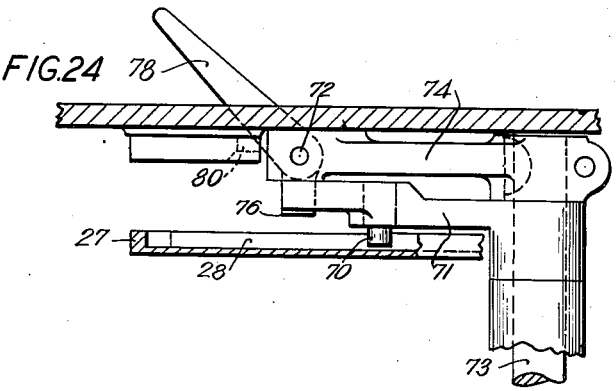
Fig. 24 is a side elevation of the parts shown in Fig. 23 with handle 78 in position to sew a 4-hole button.

The lengthwise sliding movement of shaft 119 is effected by cam 27 which operates a cam follower 70 on arm 71 which is loose on rock shaft 73 (see Figs. 22, 23 and 24). Immediately above loose arm 71 is another arm 74 which is fast to the rock shaft 73 so that when this arm is moved it will oscillate the shaft. The two arms 71 and 74 may be locked together by a swinging latch member 76 when the rock shaft 73 is to be oscillated to shift the button clamp forward between groups of stitches, or may be freed from each other during the sewing of 2-hole buttons. This latch member forms part of the rock shaft 72 on the other end of which is a handle 78. On the under side of the top plate P is a flaring notch 80 into which the latch member 76 can fit. When the handle 78 is moved to the left, from the position shown in Fig. 22 to the position shown in Fig. 24, the latch 76 engages the fork in the free end of the lower arm 71, locking the two arms 71 and 74 together so that they move as one piece and any movement of the lower arm 71 will move the upper arm 74 and consequently rock shaft 73. When the handle 78 is in the position shown in Fig. 22, the latch member 76 is in notch 80, and therefore arm 74 and consequently rock shaft 73 are held immovable.

Figure 16:
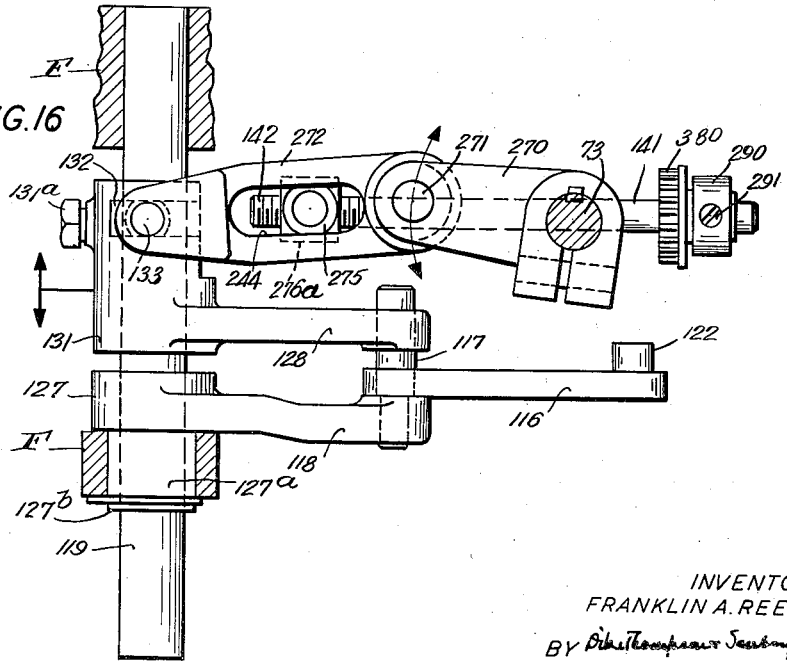
Fig. 16 is a section on line 16—16 of Fig. 15.

On the lower end of rock shaft 73, see Figs. 15 and 16, is an arm 270 connected by pivot 271 to one end of a slotted lever 272, the other end of which has a flattened stud 133, received in a slot 132 in hub 131. The pivoted lever 272 has a slot 244 in which is a sliding member 275 which itself is pivoted on block 276a. This block is movable laterally of the machine by a screw thread 142 on a shaft 141.

*Adjustment for stitch length and spacing between groups*

The four holes in 4-hole buttons are usually located at the corners of a square. The square varies in size for different sizes of buttons. To sew a 4-hole button the needle must register with one pair of holes and then register with the second pair of holes. As the holes are at the corners of the square the length of stitch between a pair of holes equals the distance between the two pairs of holes. Consequently the vibration of the clamp laterally equals the fore and aft motion of the clamp. Heretofore the adjustment for the lateral motion and the adjustment for the fore and aft motion have been two independent and separate adjustments. This method has caused considerable delay in the operation of the machine when changing from one button to another with different hole spacing. In this case the operator was required to turn the machine by hand and make the adjustment for the first pair of holes, and then to turn the machine by hand until the fore and aft motion took place. At this point the second adjustment was then made.

In the machine of this invention, both adjustments are made simultaneously, and it is not necessary for the operator to turn the machine by hand to register the needle with the holes in the button. Simply by turning the stitch-length knob 110 the operator can change from a button of one size to that of another without turning the machine by hand and without trial and error procedures.

The operator turns stitch-length knob 110 which in turn rotates screw shaft 111 to change the extent of lateral motion of the clamp. The screw shaft 111 is provided with a nut 112 threaded thereon, which nut 112 carries a pivot pin 113. A yoke 115 is provided with a hole 114 which receives the pin 113 and the legs of the yoke 115 straddle the upper end of link 116. Thus when knob 110 is rotated, nut 112 will be moved longitudinally of shaft 111 to move the upper end of link 116 with respect to member 95.

Screw shaft 111 carries a gear 160 (Figs. 1 and 12), which meshes with idler gear 161, which in turn meshes with gear 380 (Fig. 15). Gear 380 turns screw shaft 141, which, as already described, adjusts the fore and aft motion of the clamp for the spacing between two groups of stitches. The pitches of the screws on shafts 111 and 141, combined with the gear ratio between the two shafts, produce equal changes in the lateral and fore and aft movements.

To simplify this adjustment further and eliminate the necessity of turning the machine by hand and making the adjustment so that the needle registers with one pair of holes only, gear 160a on idler gear 161 meshes with gear 161d, which carries visible calibration marks. This mechanism eliminates two trial and error adjustments and enables the operator to change from one size button to another easily and quickly and without any necessity of turning the machine by hand.

It happens very rarely that odd buttons, such as the button illustrated in Fig. 5, are sewn by machine, but to take care of this situation, screw shaft 141 and screw shaft 111 can be adjusted independently. The gear 380 (Figs. 15 and 16) and collar 290 are secured to shaft 141 by set screw 291. By loosening the set screw 291, shaft 141 can be rotated with a screw driver inserted in slot 292. By turning shaft 141, the block 276a, in which the screw-threaded end 142 of shaft 141 is inserted, will be moved forward or backward in slot 244 and therefore the position of the fulcrum 275 of lever 272 is shifted. This changes the extent of movement of the pivot pin 133 and shaft 119 and the extent of transverse movement of the button clamp. Thus the distance which the clamp has to travel to bring the holes U and V or S and T (see Fig. 5) under the needle is increased or decreased and the machine can be adjusted to sew buttons having the holes placed as shown in Fig. 5. This adjustment is of very minor importance as it is required in only very special situations.

*Mechanism for changing from 2-hole to 4-hole buttons—Group selection*

At 170 (see Figs. 1, 2, 6 and 18) is shown a group selection knob by which a short rod 171 may be pulled out or pushed in to determine whether the machine will put in one or two groups of stitches. This knob 170 is located in a boss 172 (see Fig. 18) on frame F and is provided with two grooves 173 to receive alternately the point of a detent 174 normally held in engagement with the rod 171 by means of a spring 175. On the inner end of the rod 171 is a rocking trip lever 176 (see Figs. 17, 18, 19 and 22) which can be pushed sidewise nearer to or pulled farther from the center of rotation of the trip cam carrier 24. This trip cam carrier (see Fig. 20) carries two cams 178 and 179, one of which, 178, projects farther from the center of rotation of the trip cam carrier than the other. The rocking trip lever 176 has a hooked end 177. When the group selection knob 170 is pulled out, the hooked end 177 is in the path of trip cam 178, but, when it is pushed in, the hooked end 177 is in the path of both cams 178 and 179. Accordingly, the trip lever 176 will be moved once for each revolution of the trip cam carrier 24 when the group selection knob 170 is pulled out, anad twice when it is pushed in.

*The driving mechanism and stop motion*

Since the novel stop motion and clutch are claimed in a companion application, Serial No. 417,009, filed March 18, 1954, they will be described only sufficiently to assist in understanding the related mechanisms of the present invention. The clutch and stop motion (see Figs. 26 and 33) include a constantly running driving pulley 300 having a friction facing 302, an intermediate driving or clutch disc 303 and a brake disc or shoe 304 mounted on a ring 330 which can yield axially of the machine. The ring 330 on which the brake shoe 304 is mounted is carried by sliding pins 305 and is held yieldingly in position by springs 306. The extent of the yielding movement of the ring 330, and hence of the friction surface 304, is adjusted by set nuts 321 on studs 305, and the extent of movement of the ring 330 toward the driving pulley 300 by studs 320. The driving or clutch disc 303 has a hub 307 which is connected by a tongue and groove coupling 308 to the driving gear 309 of the machine. This gear 309 meshes with pinion 310 which drives the needle bar shaft 11 and a pinion 312 which drives the shuttle hook shaft 314 (see Fig. 8).

Under some circumstances it may be desirable to employ conical friction surfaces instead of flat ones, such as surfaces 331 and 332 which are shown in the modification (Fig. 27).

The driving or clutch disc 303 is mounted on a screw shaft 216 (see Fig. 33) and is movable lengthwise of it into engagement alternately with the friction facing 302 of the driving pulley and the yielding brake shoe 304. Therefore, when the driving disc 303 is at the left and in engagement with the friction face 302 of the driving pulley 300, the pulley drives the driving disc 303 and consequently the machine; but, when the screw shaft 216 is stopped from rotation, the driving or clutch disc 303 continues to rotate under its momentum and that of the machine and travels along the screw shaft 216 toward the right, as shown in Fig. 33, until it engages the yielding brake shoe 304, whereupon the driving disc 303 and the machine which is driven by it stops but the pulley 300 continues to rotate.

The mass of the screw shaft 216 is concentrated about the axis of rotation, and, therefore, the rotation of the screw shaft may be stopped positively, as shown herein, without causing perceptible jar, after which the engagement of the driving disc 303 and the brake disc 304 bring the machine to a standstill.

The screw shaft 216 (see Figs. 26 and 33) has on its front end, i.e. the left end in Fig. 33, a fork 220 (see also Fig. 37) between the legs of which is a space or guide way 221 closed by a cap 223. This cap 223 slips over pins 224 (see Fig. 35) with the ends of the legs of the fork 220 and the pins 224 in the holes 225 in the cap 223. The cap 223 carries a segment 214 (see Figs. 34 and 35). The fork 220 and cap 223 together form a guide way for a driving dog 222 slidable crosswise of the axis of screw shaft 216 (see Figs. 30 and 36).

The hub 300a of the pulley 300 (Figs. 37 and 38) is bored out as shown at 231 and within this bore is formed a driving lug 230 having adjacent to it a flat surface f. The driving lug 230 and the driving dog 222 together form a connection between the driving pulley 300 and the screw shaft 216 by means of which the pulley can alternately be connected to the screw shaft 216 (see Fig. 37) to drive it or be disconnected from it (see Fig. 38) when the machine is about to be stopped. The driving dog 222 is pushed outwardly, i.e. radially, by a spring 226 (see Fig. 36) one end of which rests in a cavity 227 on the inside of the cap 223. The driving dog 222 (see Fig. 30) has a flat end surface h, a side surface e and an inclined surface j. When the driving dog 222 is retracted, i.e. in its inward position, it is out of the path of the driving lug 230 and the driving pulley 300 can continue to revolve but the screw shaft 216, and consequently the machine, is not driven; but, when the driving dog 222 is in its outer position, its side surface e is in the path of the driving lug 230 and the screw shaft 216, and the machine will then be driven.

*Mechanism for manually starting the machine*

Fig. 28 illustrates the machine in stop position, while the running position is shown in Fig. 34, with pin 198 of release lever 199 in notch 188 of hold-down lever 185 which holds the release lever 199 out of contact with driving dog 222. To start the machine the operator steps on pedal 190a which through connection 190 pulls down the vertical sliding rod 191. Hook lever 196, also called the release pawl, is pivoted to 191 at 195. In stop position hook 197 of lever 196 registers with pin 198 on the release lever 199. Pulling down release lever 199 releases dog 222 so that it can be moved outwardly by spring 226 (Fig. 36) and the side surface e (Fig. 30) can then contact driving lug 230 of the driving pulley 300 (Fig. 37). Rotation of dog 222 rotates the worm shaft 216 which initiates the starting of the machine. If driving dog 222 was allowed to move outwardly at the comparatively slow speed of the manual depression of release lever 199, the corner of driving dog 222 would strike the corner of driving lug 230 a number of times before it could finally come into full mesh with driving lug 230. This is due of course to the high speed of rotation of pulley 300 and consequently of the driving lug 230. To prevent this, extension 217 (see Fig. 29) on a timing lever 210, which in turn is pivoted at 211 on release lever 199, is provided. Extension 217 has a cam surface d which registers with the cam surface j on dog 222. A spring 218 connected at one end to a pin 219 on the timing lever 210 and at its other end to the lever 199 tends to hold the timing lever 210 to the right in the position and against the stop pin 212, shown in Fig. 34. As lever 199 is manually pulled down, the cam surfaces d and j hold driving dog 222 in its retracted position so that it cannot get in the path of driving lug 230 in pulley 300. When release lever 199 is pulled down far enough so that cam surfaces j and d no longer contact each other, spring 218 snaps lever 210 and its extension 217 to the right, which quickly releases driving dog 222 so that its spring 226 can snap the dog outwardly and thus avoid clicking between the corner of the dog 222 and the corner of the driving lug 230.

When release lever 199 is pulled down far enough to accomplish the above, it is also pulled down far enough for pin 198 to be opposite the notch 188 in hold down lever 185. When pin 198 is opposite the notch 188, spring 186 rotates hold down lever 185 left-handedly over pin 198 and thereafter holds release lever 199 in its downward or running position.

At 2,000 stitches per minute, it takes only approximately one-quarter of a second to sew eight stitches, therefore, means is provided so that the holding down of hook lever 196 will not prevent release lever 199 rising to stop the machine at the end of eight stitches. Putting hook 197 of lever 196 out of register with pin 198 of release lever 199 is provided for in the mechanism that automatically stops the machine. The automatic stopping of the machine (to be more fully described) rotates hold down lever 185 right-handedly, which causes pin 187 to rotate hook lever 196 right-handedly and thereby put hook 197 out of register with pin 198 so that the release lever 199 is free to rise its entire distance under the influence of spring 242. Due to the interaction between pin 187 of lever 185 and cam surface 196a of hook lever 196, as well as the cam action between pin 198 of release lever 199 and the cam surface 197a of lever 196, hook 197 cannot again register with pin 198 until it has reached its uppermost position and therefore hook 197 cannot interfere with the right-handed rotation of release lever 199 when it is automatically released to stop the machine.

*Automatic stopping of the machine*

The end of the trip lever 176 opposite the hook 177 (see Fig. 22) is provided with a spherical concavity in which rests a half sphere 180 secured to the upper end or forming part of rod 181. The lower end of the rod 181 (see Figs. 8 and 28) is provided with a similar half sphere 182 which rests in a concavity in arm 183 of a rock shaft 184 having on its left end (see Fig. 40) the hold-down lever 185. Hold-down lever 185 of the rock shaft 184 is held to the left, as seen in Figs. 28 and 34, by a spring 186.

When either stop cam 178 or 179 (Figs. 17, 20 and 28) depress point 177 of trip lever 176, the left-hand end of the lever is lifted, which through the ball and socket connections and rod 181 rotate the hold-down lever 185 right-handedly, thus forcing pin 198 from notch 188 which allows it to rotate right-handedly into stop position under the influence of spring 242 (Fig. 32).

The release lever 199 is pivoted at 241 (see Figs. 28, 34 and 39), and is held up against a stop 243 on the frame F by a spring 242 (see Fig. 32). The upper surface of the release lever 199 is shaped to form a cam surface o in the path of the flat end surface h of the driving dog 222 (see Fig. 34). This cam surface o is adjacent a notch m of a suitable size to receive the driving dog and provides a shoulder p against which the driving dog 222 strikes. The shoulder p stops the rotation of the screw shaft 216 positively.

When, as shown in Figs. 28 and 32, release lever 199 is returned to stopping position, it must do so in proper timed relation with the position of dog 222 so that dog 222 will ride on cam surface o of release lever 199 which frees it from its driving connection with the worm shaft 216, namely, the driving lug 230, Fig. 37. Cam 14, which sews 12—24 groups of stitches, has a lesser angular turn per stitch than cam 22 which sews the 8—16 group of stitches (see Fig. 42). Accordingly, the machine is timed so that when sewing the 8—16 group of stitches by cam 22, the trip cams 178 and 179 will allow release lever 199 to rise into stop position in proper timed relation with dog 222. When the 12—24 groups of stitches are sewn by cam 14, trip cams 178 and 179 are not in the proper relation to allow release lever 199 to rise into timed engagement with dog 222 due to the lesser number of degrees per stitch on cam 14. Timing lever 210, already described, corrects this situation. When notch 188 is freed from pin 198 allowing the spring to return release lever 199 to stop position, timing lever 210 contacts the segment 214 (see Fig. 39), and prevents the upward movement of lever 199 until the segment is out of the way. While the parts are in this relation, dog 222 passes the shoulder *p* in lever 199 and continues its rotation until segment 214 comes around again and contacts the end of timing lever 210, moving it to the left as in Fig. 28, which allows lever 199 to rise into stopping position.

*Manual lifting of the button clamp*

The button clamp must not be lifted at any time except when the machine is in stop position. If the clamp should be lifted from the work while the machine is running it would be likely to cause the displacement of the material and button with respect to the needle and result in broken needles and other possible damage. Likewise, when the clamp is lifted, it must not be possible to start the machine. These results are accomplished by the following mechanism.

The work clamp treadle shown at 260 (Fig. 1) is connected by a chain 261 to one arm 262 of a rock shaft 263 (see Fig. 7), which is provided with a second arm 264 which is forked at its lower end and engages a pin 265 on one end of the lever 266 pivoted on a stud 267 on the frame F of the machine. On the other side of its pivot 267 the lever is provided with two arms 268, as shown in Fig. 21, and to the ends of these arms are attached cables 269, one of which is shown in Figs. 1 and 7. These cables are carried over pulleys 409 and their lower ends are connected at 410 to the post 245 on which the button clamp G is mounted.

The trip lever 176 carries a pin 276 which cooperates with a cam-shaped notch 278 on a lever 274, conveniently called the interlock lever, pivoted at 282 on the frame of the machine. This locking lever is moved by a link 273, the other end of which engages stud 265 on the upper end of arm 266 of rock-shaft 267 already described. Above and below the notch 278 in interlock lever 274 are flat surfaces 279 and 280 against which the pin 276 will strike in certain positions of the trip lever 176. This arrangement makes it impossible to lift the button clamp during sewing since the pin 276 must be opposite notch 278 to allow the clamp to be lifted.

When the parts are in running position, it must be impossible to lift the clamp since otherwise the work would be imperfect or the machine might be broken; conversely, it must be possible to lift the clamp when the machine is in stopping position. These requirements are controlled by the parts shown particularly in Fig. 17, where they are shown in running position, and in Fig. 19 where these parts are shown in stopping position.

Referring first to Fig. 17, it will be seen that the right-hand end of trip lever 176 is raised and that pin 276 is against the flat surface 279 on the piece 277 which is on the upper end of interlock lever 274. When the parts are in this position, the clamps cannot be raised since they are raised by the treadle 260 which moves arm 264 of rock shaft 263, and this in turn is connected by link 273 to the lower end of interlock lever 274, which at this time is immovable because flat surface 279 above notch 278 is in contact with pin 276.

The only point at which the clamp can be lifted is when pin 276 is opposite notch 278 in lever 274 so that this lever can be swung by the starting treadle. This position of these parts is shown in Fig. 19. In Fig. 28 release lever 199 and its pin 198 are shown in stopping position. Spring 186 swings lever 185 to the left and flat surface 189 is against pin 198 which prevents further movement of lever 185 to the left. Since the left-hand position of lever 185 is thus fixed definitely, the position of ball-and-socket joint 182 on arm 183 of rock-shaft 184, rod 181 and ball-and-socket joint 180 on the upper end of the rod are correspondingly positioned. Ball-and-socket joint 180 positions lever 176 and consequently the position of pin 276 so that it is opposite the entrance to slot 278. When the parts are in this position the lever 274 can be swung to the left and consequently the clamps can be raised. When the clamps have been raised, pin 276 is in slot 278, as illustrated in Fig. 19.

It is also to be noted, as shown in Fig. 19, that when the slot 278 engaged pin 276, the action of the slot rotating about the center 282 of lever 274 depressed the right-hand end of lever 176, which in turn raised the left-hand end of lever 176 and through the ball-and-socket joint connections and rod 181 it rotated rock shaft 184 right-handedly and consequently lever 185. When lever 185 is rotated right-handedly, its pin 187 contacted lever 196 and moved the hook of that lever 197 out of register with pin 198 in release lever 199. Therefore, if the starting pedal 190*a* should be depressed when the clamps are lifted, the machine cannot be started because the hook 197 on lever 196 does not register with pin 198 to depress release lever 199 into starting position.

*The timing of the parts*

The timing relation of the parts is illustrated by the diagrams composing Fig. 42. These diagrams show only a half revolution of cams 22 or 14 because the same conditions apply to a full revolution. In this diagram the successive positions of the needle bar are shown; also, the corresponding positions of the driving dog 222, and of the trip cams 178 and 179.

The upper diagram is for the 8—16 cam 22, the lower diagram for the 12—24 cam 14. The upper curve shows eight needle bar strokes and the lower curve twelve needle bar strokes.

As stated previously, 4-hole cam 27 rotates either with stitch cam 22 or stitch cam 14. Inasmuch as 4-hole cam 27 produces the forward and back movement of the button clamp and also rotates in unison with the trip cam carrier 24 on which are trip cams 178 and 179, these operations must be in timed relation with the 4-hole cam. The forward and backward motion occurs at the 180° and 360° points of cam 27. Trip cams 178 and 179 are also at the 180° and 360° points on 4-hole cam 27, but stopping the machine either after 8, 12, 16 or 24 stitches presents a timing problem because driving dog 222 (see Figs. 30 and 36), which rotates at one-half needle bar shaft 11 speed, is in a different position (see Fig. 41) at the end of 12 stitches than at the end of eight stitches and the same applies of course to sixteen or twenty-four stitches. Due to the worm gearing, needle bar shaft 11 turns 360° while stitch cam 22 turns 22½°. Driving dog 222 rotates at one-half the speed of needle bar shaft 11. The stopping position of the driving dog 222 is the vertically down position as illustrated in Fig. 28, i.e., when it is in the notch *m* of release lever 199. Proceeding from stitch No. 1 to stitch No. 5, the driving dog 222 is up when the needle is up. To stop the machine without jar it is necessary to allow two full turns of needle bar shaft 11. Between stitches Nos. 5 and 6 the trip cams, either 178 or 179 (see Fig. 22), it makes no difference which, as both operate the same, push down hooked end 177 of trip lever 176 which, through its connections, moves lever 185 to the right (see Fig. 35) and frees pin 198 from notch 188, which allows lever 199 to rise into stopping position when driving dog 222 has moved about 30° beyond its top position. This is illustrated at point "A" in the lowest row of the top diagram.

The reason for having lever 199 rise at this position is to give it time to get into its stop position by the time driving dog 222 contacts the cam surface *o* of lever 199. The driving dog 222 then falls into notch *m* and stops worm shaft 216 when the needle is at the top of its stroke after stitch 6. The needle then takes stitches 7 and 8 while driving disc 303 is moving to the right into contact with the yielding brake member 304 and the machine is brought to a standstill with the needle up.

The lower diagram of Fig. 42 is for twelve stitches. Needle bar shaft 11 turns 360° while stitch cam 14 turns 15° due to the gearing which drives this cam. Trip cams 178 and 179 are in the same position as they were for stitch cam 22. Therefore, the trip cam pushes down hooked end 177 of lever 176 when the needle is approximately half way up after stitch 8 and at this time driving dog 222 extends downward at an angle of approximately 45°. See the position C in the lowest row of figures which shows the successive positions of the driving dog 222. If the worm shaft was stopped just after this position stitches 9 and 10 would be sewn and the machine would thus come to a stop. However, timing lever 210 contacts segment 214 on cover 223 (see Fig. 39), which turns with the worm shaft 216, and this prevents lever 199 from rising to stop position with the result that driving dog 222 makes another revolution during which stitches 9 and 10 are sewn. When the driving dog 222 completes its revolution at the tenth stitch, it drops into notch *m* in lever 199 and this stops the worm shaft 216. The machine continues to rotate for two more revolutions, thereby putting in stitches 11 and 12. During this time driving disc 303 is moving to the right into contact with the yielding brake member 304, bringing the machine to a standstill with the needle up.

It will be understood that cam tracks 14a and 22a are laid out so that the clamp is not vibrated during the sewing of the last two stitches, i.e., 7 and 8, when the 8—16 stitch cam 22 is effective, and 11 and 12 when the 12—24 stitch cam 14 is effective. The result is that these stitches are put in the same hole and consequently are tying stitches which serve to fasten the thread and prevent unravelling. In other words, the tying stitches are put in while the machine is slowing down before being stopped. The number and position of the tying stitches will depend on the layout of the cam tracks of cams 14 and 22 respectively.

*Adjustments to be made for 8, 16, 12 and 24 stitches*

While sewing eight stitches in a 2-hole button, cam shift knob 31 (see Fig. 9) on spline shaft 30 is up and splines 36 mesh with splines 38 in stitch cam 22 so that cam 22 and 4-hole cam 27 rotate in unison. Cam follower stud 94 (see Fig. 13) will then be in cam groove 22a of stitch cam 22, handle 78 is at the right, as illustrated in Fig. 22, thus freeing arm 74 from arm 71 of rock shaft 73 and locking arm 74 to notch 80 in the top plate P. Group selection knob 170 is in so that the end 177 of trip lever 176 is in the path of both stop cams 178 and 179, thus stopping the machine after each 180° turn of cams 22 and 27. To sew sixteen stitches in a 2-hole button, knob 170 is pulled out, which is the only change required so that only one trip cam will contact the end 177 of lever 176. To sew sixteen stitches in a 4-hole button, handle 78 is pulled to the left to the position shown in Fig. 24, thus locking arm 74 to arm 71 which causes cam groove 28 in 4-hole cam 27 to move rock shaft 73 which, through its connections (see Fig. 15) to shaft 119, moves the clamp G forward between groups of stitches.

To sew twelve stitches, cam shift knob 31 and shaft 30 are pushed down so that splines 36 mesh with splines 39 in the cover plate 20 which is connected to stitch cam 14; therefore, cam 14 and 4-hole cam 27 rotate in unison. Cam follower shift knob 87 is pulled out which frees cam follower 94 from cam groove 22a and inserts cam follower 98 into cam groove 14a of cam 14 (see Fig. 13). Lever 78 is at the right and group selection knob 170 is in. To sew twenty-four stitches in a 2-hole button or twenty-four stitches in a 4-hole button, the same changes are made as were made for the 8—16 stitch combination.

I claim:

1. In a button sewing machine having a reciprocating needle and in combination two stitch cams producing a relative motion between the work and the needle in one direction and having cam tracks for different numbers of stitches, and a third cam producing a relative movement between the work and the needle in a direction different from that produced by the stitch cams, and means connecting the third cam with either of said stitch cams.

2. In a button sewing machine and in combination with stitching instrumentalities, including a needle, and a work clamp, two stitch cams producing a relative movement between the work clamp and the needle in one direction, said stitch cams having cam tracks producing different numbers of stitches, and a third cam to shift the work clamp relatively to the needle and in a direction different from that produced by the stitch cams, and means to connect the third cam alternately with said stitch cams.

3. In a button sewing machine and in combination with stitching instrumentalities and a button clamp, two stitch cams having different cam tracks therein, means for rotating the cams at different rates of speed, means connecting them alternately with the button clamp, a third cam for moving the button clamp forward and back and connections connecting the third cam with whichever stitch cam is operatively connected to the button clamp.

4. In a button sewing machine and in combination with stitching instrumentalities and a button clamp, two stitch cams each having a cam track for putting in successively two groups of stitches of different numbers with a tying stitch at the end of each group, means connecting them alternately with the button clamp, a third cam moving the button clamp forward and back at the end of a group of stitches and connections connecting the third cam with whichever stitch cam is operatively connected to the button clamp.

5. In button sewing machine, at least two stitch cams having cam tracks for different numbers of stitches, driving means for one of said cams, gearing by which another cam is driven from the first at a different rate of speed, said stitch cams having central splined holes therein, and a shaft located in said holes and having splines interfitting with splines in said cams, said shaft being movable lengthwise out of engagement with one of the cams and into engagement with another.

6. In a button sewing machine, at least two stitch cams having cam tracks for different numbers of stitches, driving means therefor, gearing between the driving means and the stitch cams having different speed ratios, and shifting means disconnecting one cam and connecting another to cause the machine to sew different numbers of stitches in a group.

7. In a button sewing machine, a button clamp and stitching mechanism, said clamp and stitching mechanism being movable relatively to each other in two directions at right angles, stitch cams having different grooves for putting in different numbers of stitches, cam followers therefor, mechanism for shifting cam followers, a stitch cam shaft on which the stitch cams are mounted, variable ratio gearing to revolve the stitch cams at different appropriate speeds, a stop motion, a third cam rotating in unison with the stitch cams and operating to operate the stop motion on completion of a complete or one-half rotation of the stitch cam shaft, said shaft being slidable to selectively connect said third cam to one of said stitch cams.

8. In a button sewing machine and in combination with stitching instrumentalities and a work clamp, two stitch cams producing a relative motion between the clamp and the stitching instrumentalities in one direction and having cam tracks operating the clamp to sew different numbers of stitches, gearing connecting one cam with the other and rotating it at a different rate of speed, a cam follower for each stitch cam, means connecting one follower with its stitch cam and simultaneously disconnecting the other, a third cam producing a relative motion between the clamp and the stitching instrumentalities transversely to that produced by the stitch cams, and means connecting the third cam with whichever of said stitch cams is connected to its follower.

9. In combination with stitching instrumentalities and a button clamp, two independently movable cams each producing relative movement between the button clamp and the stitching instrumentalities and having cam tracks operating the button clamp, driving means including gearing rotating the cams at different rates of speed and means simultaneously connecting one cam and disconnecting the other from the button clamp.

10. In a button sewing machine having stitching mechanism and a button clamp, two independently movable cams for controlling the button clamp and operating to move the button clamp relative to the stitching mechanism to put in different numbers of stitches, means for rotating the cams at different rates of speed, a cam follower for each cam and a movable member in engagement with said cam followers and operating to withdraw one follower from engagement with its cam while placing the other in engagement with its cam.

11. In a button sewing machine having stitching mechanism and a button clamp, two independently movable stitch cams controlling the button clamp and having different grooves operating to move the button clamp and the stitching mechanism relatively to each other to put in different numbers of stitches, gearing connecting one cam with the other and rotating it at a different rate of speed, a cam follower for each groove, a movable member pivoted between its ends and engaging the cam followers and operating to withdraw one follower from its groove while inserting the other in its groove.

12. In a button sewing machine, sewing instrumentalities and a button clamp, means for moving the clamp crosswise during stitching of the button, means for moving it lengthwise between groups of stitches, and simultaneously acting means changing the amplitude of both movements.

13. In a button sewing machine, sewing instrumentalities and a button clamp, means for moving the clamp crosswise during stitching of the button, means for moving it lengthwise between groups of stitches, simultaneously acting means changing the amplitude of both movements, and an indicator showing the amount of movement of the clamp.

14. In a button sewing machine, sewing instrumentalities, a button clamp, means for moving the clamp crosswise during stitching, means for moving it lengthwise between groups of stitches and a movable member acting simultaneously on both said means and changing the amplitude of both movements.

15. In a button sewing machine, sewing instrumentalities, a button clamp, means for moving the clamp crosswise during stitching, means for moving it lengthwise between groups of stitches, and a movable member acting simultaneously on both said means and changing equally the amplitude of both movements.

16. In a button sewing machine, sewing instrumentalities, a button clamp, means for moving the clamp crosswise during stitching, means for moving it lengthwise between groups of stitches, a movable member acting simultaneously on both said means and changing the amplitude of both said movements, and disconnecting means for disconnecting the lengthwise moving means.

17. In a button sewing machine, sewing instrumentalities and a button clamp, means to cause a relative movement between the sewing instrumentalities and button clamp to place stitches at the corners of a parallelogram and a single adjustment to simultaneously change the length of all sides of the parallelogram to cause the stitches to be placed at the corners of variable sizes of parallelograms.

18. In a button sewing machine for sewing 4-hole buttons having two pairs of holes spaced equidistant from each other and in combination stitching instrumentalities, a button clamp movable laterally to put in stitches between each pair of holes, said button clamp movable at right angles to its first direction of movement to put in successive groups of stitches in the two pairs of holes, a stitch cam having a cam track the first part of which corresponds to the number of stitches and tying stitches to be put in the first pair of holes and the second part of which corresponds to the number of stitches and tying stitches to be put in the other pair of holes, a cam follower, a 4-hole cam rotating in unison with the stitch cam, connections between the 4-hole cam and the button clamp to shift the button clamp after the completion of the stitching of one pair of holes and before the stitching of the second pair of holes, a second stitch cam having a cam track corresponding to different numbers of stitches, means for disconnecting the first stitch cam from and connecting the second stitch cam to the button clamp, interlocking means to prevent both being connected to drive at the same time and a lug carrier rotating in unison with whichever stitch cam is connected to the 4-hole cam and a stop motion operated by the lug carrier to stop the machine on the completion of the second set of stitches.

19. In a button sewing machine, a plurality of separate stitch cams having cam tracks for different numbers of stitches, a driving shaft around the axis of which said cams rotate, connecting means to connect one cam to the driving shaft and simultaneously disconnect the previously connected cam, a stop motion, means moving with the selected stitch cam and operable on the completion of a half revolution or of a whole revolution to actuate the stop motion and stop the machine, and means to render the last named means inoperative after a half revolution.

20. In a button sewing machine for sewing buttons having either 2-holes or 4-holes and in combination a button clamp, means shifting the button clamp relative to a needle to bring successive pairs of holes into sewing position, a cam, a cam follower, said cam follower being constantly in engagement with said cam, connections by which the cam follower shifts the button clamp, and a manually controlled separable connection included in said connections by which the cam follower may be detached from the button clamp rendering the cam inoperative to shift the button clamp.

21. In a button sewing machine for sewing 2-hole and 4-hole buttons and in combination with a button clamp and stitch-forming instrumentalities, shifting mechanism moving the clamp between pairs of holes when 4-hole buttons are being sewn, a cam actuating said shifting mechanism after the first pair of holes has been sewn, a rock shaft having thereon a pair of levers one of which is fast to the rock shaft and the other is loose thereon, the loose lever being provided with a cam follower engaging the said cam, and means detachably locking together the two levers whereby when the two levers are locked together the cam will shift the position of the clamp and when they are not locked together the cam will be inoperative for this purpose.

22. In a button sewing machine for sewing 2-hole and 4-hole buttons and in combination with a button clamp and stitch-forming instrumentalities, shifting mechanism moving the clamp between pairs of holes when 4-hole buttons are being sewn, a cam actuating said shifting mechanism after the first pair of holes has been sewn, a rock shaft having thereon a pair of levers one of which is fast to the rock shaft and the other is loose thereon, the loose lever being provided with a cam follower engaging the said cam, and manually operable means detachably locking together the two levers whereby when the two levers are locked together the cam will shift the position of the clamp and when they are not locked together the cam will be inoperative for this purpose.

23. In a button sewing machine for sewing 2-hole and 4-hole buttons and in combination with a button clamp and stitch-forming instrumentalities, shifting mechanism moving the clamp between pairs of holes when 4-hole buttons are being sewn, a cam actuating said shifting mechanism after the first pair of holes has been sewn, a rock shaft having thereon a pair of levers one of which is fast to the rock shaft and the other is loose thereon, the loose lever being provided with a cam follower engaging the said cam, and a latch mounted on the lever which is fast to the rock shaft and is engageable with the loose lever so that the two levers will then move in unison.

24. In a button sewing machine for sewing 2-hole and 4-hole buttons and in combination with a button clamp and stitch-forming instrumentalities, shifting mechanism moving the clamp between pairs of holes when 4-hole buttons are being sewn, a cam actuating said shifting mechanism after the first pair of holes has been sewn, a rock shaft having thereon a pair of levers one of which is fast to the rock shaft and the other is loose thereon, the loose lever being provided with a cam follower engaging the said cam, and a latch mounted on the lever which is fast to the rock shaft and which in one position engages the loose lever so that the two levers move as one piece and in another position engages a fixed portion of the machine and holds the fast lever and the rock shaft in a fixed predetermined position.

25. In a button sewing machine, a frame, two stitch cams mounted on said frame rotatable with respect to each other and being aligned with each other in certain angular positions, a signal mounted on said frame, and means mounted on said cams for actuating said signal to indicate when the cams are aligned.

26. In a button sewing machine, a frame, driving means mounted on said frame, two stitch cams mounted on said frame having cam tracks for different numbers of stitches and capable of being aligned with each other, gearing connecting the driving means and the cams and rotating the cams at different speeds, a signal mounted on said frame, and means mounted on said cams for actuating said signal to indicate when they are aligned with each other.

27. In a button sewing machine having stitching instrumentalities and a button clamp, a frame, two stitch cams mounted on said frame having cam tracks for different numbers of stitches, a third cam shifting the button clamp with respect to the stitching instrumentalities, means connecing the third cam alternately with either of the stitch cams, a signal mounted on said frame, and means mounted on said cams for actuating said signal to indicate when all three cams are aligned.

28. In a button sewing machine, a frame, a stitch cam shaft mounted on said frame, a plurality of stitch cams capable of being selectively connected to the stitch cam shaft to rotate it at different speeds, a signal mounted on said frame and means mounted on the cams for actuating the signal to indicate the angular positions of the cams.

29. In a button sewing machine, a frame, a stitch cam shaft mounted on said frame, a plurality of stitch cams mounted on said frame to impart a relative motion between the needle and the work and capable of being selectively connected to the stitch cam shaft to rotate it at different speeds, a cam mounted on said frame imparting a different relative motion between the needle and the work, and a signal mounted on said frame which indicates the angular position of the last mentioned cam with respect to the before mentioned cams.

30. In a button sewing machine, a frame, two stitch cams mounted on said frame having cam tracks for different numbers of stitches, and a clamp-shifting cam mounted on said frame rotatable with respect to said stitch cams about a common axis and being aligned with each other, signal pins mounted in the cams arranged to contact each other when the cams are in correct starting position, and a signal mounted on said frame and operated by the said pins when they are in contact with each other.

31. In a button sewing machine having stitching instrumentalities and a button clamp, a frame, two stitch cams mounted on said frame having different cam tracks, means rotating the cams at different speeds, a third cam mounted on said frame for shifting the button clamp with respect to the stitching instrumentalities, means connecting the third cam with either of the stitch cams alternately, and operable only when the cams are correctly lined up, signal pins in the cams positioned to be aligned with each other, and a signal mounted on said frame and operated by the pins when they are aligned.

32. In a button sewing machine, two stitch cams, and a clamp shifting cam superposed thereon, connections connecting the clamp shifting cam for rotation with either of said stitch cams, a sliding pin in the frame, another in the clamp shifting cam, and another in the next adjacent cam, said lowest cam having a depression in its upper surface into which the end of the pin in the adjacent cam can enter, said sliding pins being in line with each other when the cams are aligned, and being raised and exposing the pin in the frame when the cams are out of shifting position and lowered and concealing said pin when the cams are in shifting position.

33. In a button sewing machine, a frame, a plurality of stitch cams mounted on said frame having cam tracks for different numbers of stitches, a sliding shaft mounted on said frame around the axis of which said cams rotate, connecting means on the shaft and on the cams to connect one cam on the sliding shaft and simultaneously disconnect a previously connected cam, said cams having holes in alignment with each other when the cams are in position to permit shifting, pins in said aligned holes in endwise engagement with each other and a signal mounted on said frame and operated by said pins and indicating the position of the cams with respect to each other.

34. In a button sewing machine, two stitch cams and a clamp shifting cam superposed one on the other, connections connecting the clamp-shifting cam for rotation with either of said stitch cams, a sliding pin in the frame, another in the clamp shifting cam, and another in the next adjacent cam, said lowest cam having a depression in its upper surface into which the end of the pin in the adjacent cam can enter, said sliding pins being in line with each other when the cams are aligned and in shifting position, and being raised and exposing the pin on the frame when the cams are out of shifting position, and lowered and concealing said pin when the cams are in starting position.

35. In a button sewing machine and in combination with stitching instrumentalities and a button clamp, cams moving the stitching instrumentalities and the clamp with respect to each other in timed relation, driving means, means connecting and disconnecting the driving means, a release lever controlling the connecting means, a trip cam, means actuated by the trip cam and acting on the release lever to allow the release lever to move it in one direction and actuate the connecting and disconnecting means to stop the machine, a starting treadle, and means operated by the starting treadle to move the release lever in the opposite direction to start the machine, and means engaging said last named means whereby it is disconnected from said release lever when said driving means is in operation.

36. In a button sewing machine and in combination with stitching instrumentalities and a button clamp, cams moving the stitching instrumentalities and the clamp with respect to each other in timed relation, driving means, means connecting and disconnecting the driving means, means controlling the connecting meas, a trip cam, means actuated by the trip cam and acting on the controlling means to allow the controlling means to move it in one direction and actuate the connecting and disconnecting means to stop the machine, a starting treadle, and means operated by the starting treadle to move the controlling means in the opposite direction to start the machine, and means engaging said treadle operated means whereby it and said controlling means are disconnected when said driving means is in operation.

37. In a button sewing machine and in combination with stitching instrumentalities and driving mechanism therefor, means connecting the stitching instrumentalities to the driving mechanism, means controlling the operation of said connecting means, manually actuated starting means, connections between it and the controlling means, a trip cam acting at a predetermined point in the cycle of operation of the machine to stop it, locking means disconnecting the starting means and the controlling means during operation of the stitching means, and means operated by the trip cam to release the controlling means whereby said starting means and said controlling means will be reconnected to make it possible to start the machine.

38. In a button sewing machine, a work clamp, a drive shaft, a release lever rotatable in a plane at right angles thereto which in one angular position initiates the stopping of the machine and in another angular position allows the machine to be driven, manually operated means to place the release lever in machine running position and automatic means to release the lever for movement to machine stopping position, said automatic means including means to disengage said manually operated means from said release lever whereby said manually operated means is prevented from retaining said release lever in machine running position, manual means to disengage the work clamp from the work and interlocking connecting means between the release lever and the work clamp which is interlocked with the release lever and prevents disengagement of the work clamp from the work when the release lever is in machine running position.

39. In a button sewing machine, driving means therefor, a rotatable screw shaft forming part of the stop motion therefor, a yieldingly movable driving dog normally protruding beyond the periphery of the screw shaft, a rotating driving member having a driving lug thereon in the path of the driving dog when in protruded position, stitch cams having cam tracks for different numbers of stitches, gearing rotating the stitch cams at different rates of speed, a trip cam connected alternately with the stitch cams, means acting on the driving dog to move it out of the path of the driving lug, said means having a shoulder thereon to stop the movement of the driving lug, manually operated means to move the shoulder on the release lever out of the path of the driving lug to start the machine and means operated by the trip cam to allow the release lever to move into the path of the driving lug and stop the rotation of the screw shaft.

40. In a sewing machine, a driving member, a driven member, a retractable dog connecting the driving and driven member and urged in one direction by a spring, a lever movable in a plane at right angles to the axis of the driving member and having a surface in the path of movement of the dog to hold it in disconnected position, manual means to move the lever away from the dog to allow the dog to connect the driving and driven means, and means mounted on the lever to hold the dog in disconnected position as the lever is manually moved out of the path of the dog.

41. In a sewing machine, a driving member, a driven member, a retractable dog connecting the driving and driven member and urged in one direction by a spring, a lever movable in a plane at right angles to the axis of the driving member and having a surface in the path of movement of the dog to hold it in disconnected position, manual means to move the lever away from the dog and inter-connecting means between the dog and the lever to hold the dog in disconnected position as the lever is moved away from the dog until the surface of the lever that contacts the dog is moved out of the path of the dog when in protruded position at which point the inter-connecting means allows the spring to snap the dog into the path of the driving member.

42. In a button sewing machine and in combination, stitch-forming instrumentalities, a button clamp, a stitch cam having a cam track moving the button clamp with respect to the stitch-forming instrumentalities to form a series of stitches, braking means fixed against rotation to stop the machine and means initiating the action of the braking means before the end of the series of stitches is reached whereby the remaining stitches of the series are put in while the machine is slowing down.

43. In a button sewing machine and in combination, stitch-forming instrumentalities, a button clamp, a stitch cam having a cam track moving the button clamp with respect to the stitch-forming instrumentalities to form a series of stitches, at least one stitch at the end of the series being a tying stitch, a rotating part having small rotational momentum and rotating at a constant speed, means stopping the rotation of the said part before the tying stitches are put in, a brake member fixed against rotation whose braking action is initiated by the stopping of the rotational movement of the said machine, said brake member acting while the typing stitches are being put in.

44. In a button sewing machine, two stitch cams mounted on the machine and operating at different speeds, means to select one of said cams to sew a predetermined number of stitches in a stitch group, a stop lever mounted on the machine to initiate the stopping of the machine, a trip cam operating in unison with the selected stitch cam and actuating said stop lever, a rotating part forming part of the machine automatically stopped by the stop lever, a timing device mounted on the stop lever for engagement with the rotating part to time the motion of the stop lever in conjunction with the selected stitch cam.

45. In a button sewing machine, a driving pulley mounted on the machine, two stitch cams mounted on the machine to cause a relative motion between the needle and the work, the degrees turned by one cam for one stitch differing from the degrees turned by the other cam for one stitch, a rotating shaft mounted on the machine that when stopped initiates the stopping of the machine, a dog mounted on the shaft and rotating therewith and connecting the rotating shaft with the driving pulley, a stop lever mounted on the machine that disconnects the dog from the driving pulley and stops the rotating shaft, a timing device mounted on the stop lever between the stop lever and rotating shaft that times the automatic motion of the stop lever with respect to the angular position of the shaft and the dog when the shaft and the dog rotate in timed relation with one or the other of the stitch cams.

46. In a button sewing machine and in combination two stitch cams producing a relative motion between the needle and the work in one direction, and each having cam tracks producing different numbers of stitches in two groups, means rotating said cams at different speeds, a third cam producing a relative motion between the needle and the work crosswise to that produced by the stitch cams, means for connecting the third cam alternately to one stitch cam or the other, said third cam having a cam track timed with the stitch cams to produce a change of position of the work relative to the needle between groups of stitches.

47. In a button sewing machine and in combination two stitch cams producing a relative motion between the needle and the work in one direction, and each having cam tracks producing different numbers of stitches in two groups, means rotating said cams at different speeds, a third cam producing a relative motion between the needle and the work crosswise to that produced by the stitch cams, means for connecting the third cam alternately to one stitch cam or the other, said third cam having a cam track timed with the stitch cams to produce a change of position of the work relative to the needle between groups of stitches and stop mechanism operating to stop the machine after each group of stitches.

48. In a button sewing machine and in combination, a stop mechanism, two stitch cams producing a relative motion between the needle and the work in one direction, and each having cam tracks producing different numbers of stitches in two groups, means rotating said cams at different speeds, a third cam producing a relative motion between the needle and the work crosswise to that produced by the stitch cams, means for connecting the third cam alternately to one stitch cam or the other, said third cam having a cam track timed with the stitch cams to produce a change of position of the work relative to the needle between groups of stitches, a trip cam having two cam members each operating the stop mechanism to stop the machine after a group of stitches, and means rotating the trip cam in unison with the stitch cams.

49. In a button sewing machine and in combination with stop mechanism, two stitch cams producing a relative motion between the needle and the work in one direction, and each having cam tracks producing different numbers of stitches in two groups, means rotating said cams at different speeds, a third cam producing a relative motion between the needle and the work crosswise to that produced by the stitch cams, means for connecting the third cam alternately to one stitch cam or the other, said third cam having a cam track timed with the stitch cams to produce a change of position of the work relative to the needle between groups of stitches, a trip cam having two cam members each operating the stop mechanism to stop the machine after a group of stitches, means rotating the trip cam in unison with the stitch cams, and a trip lever always in the path of one cam member and movable into the path of the second cam member.

50. In a button sewing machine and in combination, a stop mechanism, two stitch cams producing a relative motion between the needle and the work in one direction, and each having cam tracks producing different numbers of stitches in two groups, means rotating said cams at different speeds, a third cam producing a relative motion between the needle and the work crosswise to that produced by the stitch cams, means for connecting the third cam alternately to one stitch cam or the other, said third cam having a cam track timed with the stitch cams to produce a change of position of the work relative to the needle between groups of stitches, a trip cam having two cam members each operating the stop mechanism to stop the machine after a group of stitches, and a trip lever in the path of one cam member and movable toward and away from the center of rotation of the trip cam and thereby into or out of the path of the other cam member.

51. In a button sewing machine and in combination, two stitch cams producing a relative motion between the needle and the work, each cam having a cam track for a number of stitches different than the cam track of the other cam, means for rotating the cams simultaneously at different speeds, a third cam, means connecting the third cam for rotation with either of said stitch cams, a drive shaft, stopping means for the machine, and means actuated by the third cam and acting to disconnect the drive shaft and stop the machine at a predetermined point in the cycle of operation.

52. In a button sewing machine and in combination, a drive shaft, two stitch cams producing a relative motion between the needle and the work, each cam having a cam track for a number of stitches different than the cam track of the other cam, connecting means for connecting the drive shaft with both cams and simultaneously rotating the cams at different speeds, a third cam, means connecting the third cam with either stitch cam and rotating it at the same speed as the cam to which it is connected, stopping means for the machine, and means activated by the third cam to disconnect the drive shaft and stop the machine at a predetermined point in the cycle of operation.

53. In a button sewing machine, a button clamp and stitching mechanism said clamp and stitching mechanism being movable relatively to each other in two directions at right angles, stitch cams having different grooves for putting in different numbers of stitches, cam followers therefor, mechanism for shifting said cam followers and including an interlock to prevent both being connected to the cams at the same time, and variable ratio gearing to revolve the cams simultaneously at different appropriate speeds.

54. In a button sewing machine, a button clamp and stitching mechanism, said clamp and stitching mechanism being movable relatively to each other in two directions at right angles, stitch cams having different grooves for putting in different numbers of stitches, cam followers therefor, mechanism for shifting said cam followers and including an interlock to prevent both being connected to the cams at the same time, a stitch cam shaft on which the stitch cams are mounted, variable ratio gearing to revolve the cams simultaneously at different appropriate speeds, a stop motion, and a third cam rotating in unison with either of the stitch cams and operating to operate the stop motion on completion of a selected degree of rotation of the switch cam shaft.

55. In a button sewing machine, driving mechanism and a stop motion therefor, a button clamp and stitching mechanism, said clamp and stitching mechanism being movable relatively to each other in two directions at right angles, stitch cams having different grooves for putting in different numbers of stitches, cam followers for the stitch cams, mechanism for shifting said cam followers and including an interlock to prevent both being connected to the cams at the same time, a stitch cam shaft on which the stitch cams are mounted, variable ratio gearing to revolve the cams simultaneously at different appropriate speeds, and a third cam rotating in unison with either of the stitch cams and operating to operate the stop motion on completion of a selected degree of rotation of the stitch cam shaft, said shaft being slidable to connect selectively said third cam to one of said stitch cams.

56. In a button sewing machine, driving mechanism and a stop motion therefor, a button clamp and stitching mechanism, said clamp and stitching mechanism being movable relatively to each other in two directions at right angles, stitch cams having different grooves for putting in different numbers of stitches, cam followers therefor, mechanism for shifting the cam followers, a stitch cam shaft on which the stitch cams are mounted, variable ratio gearing to revolve the cams at different appropriate speeds, a third cam rotating in unison with the stitch cams and operating to operate the stop motion on completion of a selected degree of rotation of the stitch cam shaft, said stitch cam shaft being movable to connect said third cam to a selected one of said stitch cams.

57. In a button sewing machine and in combination, driving mechanism and a stop motion therefor, two stitch cams producing a relative motion between the needle and the work in one direction, and each having cam tracks producing different numbers of stitches in two groups, means rotating said cams at different speeds, a third cam producing a relative motion between the needle and the work crosswise to that produced by the stitch cams, means for connecting the third cam alternately to one stitch cam or the other, said third cam having a cam track timed with the stitch cams to produce a change of position of the work relative to the needle between groups of stitches, a trip cam having two cam members thereon, and a trip lever in the path of one cam member and movable toward and away from the center of rotation of the trip cam and thereby into and out of the path of the other cam member, said trip lever when actuated by said cam members operating the stop motion to stop the machine.

References Cited in the file of this patent

UNITED STATES PATENTS

| | | |
|---|---|---|
| 1,480,239 | Chaplin | Jan. 8, 1924 |
| 1,545,116 | Ashworth | July 7, 1925 |
| 1,978,975 | Winans | Oct. 30, 1934 |
| 2,367,187 | Collins | Jan. 16, 1945 |
| 2,377,037 | Reece | May 29, 1945 |
| 2,383,875 | Maxant | Aug. 28, 1945 |
| 2,385,768 | Althens | Oct. 2, 1945 |
| 2,405,871 | Avis | Aug. 13, 1946 |
| 2,487,718 | Maxant | Nov. 8, 1949 |
| 2,511,367 | Nelson | June 13, 1950 |
| 2,540,730 | Hayes | Feb. 6, 1951 |
| 2,571,303 | Spiller et al. | Oct. 16, 1951 |
| 2,747,715 | Brinkman et al. | May 29, 1956 |

FOREIGN PATENTS

| | | |
|---|---|---|
| 1,059,888 | France | Nov. 18, 1953 |